(12) United States Patent
Okeya et al.

(10) Patent No.: US 12,078,377 B2
(45) Date of Patent: Sep. 3, 2024

(54) VENTILATOR THAT DETECTS INDOOR AND OUTDOOR CO2 CONCENTRATIONS AND VENTILATION CONTROL METHOD

(71) Applicant: Mitsubishi Electric Corporation, Tokyo (JP)

(72) Inventors: Kenta Okeya, Tokyo (JP); Keiji Kameishi, Tokyo (JP); Hidekazu Hirai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 723 days.

(21) Appl. No.: 17/271,647

(22) PCT Filed: Sep. 10, 2018

(86) PCT No.: PCT/JP2018/033515
§ 371 (c)(1),
(2) Date: Feb. 26, 2021

(87) PCT Pub. No.: WO2020/053946
PCT Pub. Date: Mar. 19, 2020

(65) Prior Publication Data
US 2021/0341168 A1    Nov. 4, 2021

(51) Int. Cl.
*F24F 11/77* (2018.01)
*F24F 7/007* (2006.01)
(Continued)

(52) U.S. Cl.
CPC ............ *F24F 11/77* (2018.01); *F24F 7/007* (2013.01); *F24F 7/08* (2013.01); *F24F 2110/70* (2018.01)

(58) Field of Classification Search
CPC ........ F24F 11/0001; F24F 11/77; F24F 7/007; F24F 7/08; F24F 2011/0002; F24F 2110/70; F24F 12/006
See application file for complete search history.

(56) References Cited

U.S. PATENT DOCUMENTS

| | | | |
|---|---|---|---|
| 2006/0234621 A1* | 10/2006 | Desrochers | F24F 3/044 702/50 |
| 2012/0052791 A1* | 3/2012 | Kurelowech | F24F 11/64 454/329 |
| 2020/0326088 A1* | 10/2020 | Mowris | G05B 19/042 |

FOREIGN PATENT DOCUMENTS

| | | |
|---|---|---|
| EP | 1752715 A1 | 2/2007 |
| EP | 3569943 A1 | 11/2019 |

(Continued)

OTHER PUBLICATIONS

International Search Report (PCT/ISA/210) issued on Nov. 13, 2018, by the Japan Patent Office as the International Searching Authority for International Application No. PCT/JP2018/033515.

(Continued)

*Primary Examiner* — Edelmira Bosques
*Assistant Examiner* — Michael James Giordano
(74) *Attorney, Agent, or Firm* — BUCHANAN INGERSOLL & ROONEY PC

(57) ABSTRACT

A ventilator includes: a blower unit that exchanges indoor air; a corrected threshold calculation unit that calculates a corrected threshold by correcting a predetermined threshold of $CO_2$ concentration in the indoor air for changing a ventilation air volume on the basis of a detected outdoor air $CO_2$ concentration value that is $CO_2$ concentration in outdoor air detected; and a ventilation air volume control unit that changes the ventilation air volume by controlling an air volume of the blower unit on the basis of the $CO_2$ concentration in the indoor air and the corrected threshold.

17 Claims, 10 Drawing Sheets

(51) Int. Cl.
*F24F 7/08* (2006.01)
*F24F 110/70* (2018.01)

(56) References Cited

FOREIGN PATENT DOCUMENTS

| | | | | |
|---|---|---|---|---|
| JP | H09159208 A | | 6/1997 | |
| JP | 2009144965 A | | 7/2009 | |
| JP | 2013011405 A | * | 1/2013 | |
| JP | 2013011405 A | | 1/2013 | |
| JP | 2014095532 A | | 5/2014 | |
| KR | 2003-0063856 A | | 7/2003 | |
| WO | WO-0220136 A1 | * | 3/2002 | ............. A61G 10/02 |
| WO | 2018/139015 A1 | | 8/2018 | |

OTHER PUBLICATIONS

Written Opinion (PCT/ISA/237) issued on Nov. 13, 2018, by the Japan Patent Office as the International Searching Authority for International Application No. PCT/JP2018/033515.
Extended European Search Report dated Aug. 27, 2021, issued in corresponding European Patent Application No. 18933719.9, 8 pages.
Office Action (Notice of Reasons for Refusal) issued Jun. 22, 2021, in corresponding Japanese Patent Application No. 2020-546567 and English translation of the Office Action. (6 pages).

* cited by examiner

| $CO_2$ CONCENTRATION IN INDOOR AIR | VENTILATION AIR VOLUME | |
|---|---|---|
| LOWER THAN 700ppm | LOW | ·REFERENCE OUTDOOR AIR $CO_2$ CONCENTRATION VALUE=400ppm<br>·DETECTED OUTDOOR AIR $CO_2$ CONCENTRATION VALUE=400ppm<br>·FIRST SWITCHING THRESHOLD=700ppm<br>·SECOND SWITCHING THRESHOLD=800ppm |
| 700ppm OR HIGHER AND LOWER THAN 800ppm | MEDIUM | |
| 800ppm OR HIGHER | HIGH | |

FIG.5

| $CO_2$ CONCENTRATION IN INDOOR AIR | VENTILATION AIR VOLUME | · REFERENCE OUTDOOR AIR $CO_2$ CONCENTRATION VALUE=400ppm<br>· DETECTED OUTDOOR AIR $CO_2$ CONCENTRATION VALUE=450ppm<br>· DIFFERENCE $\alpha$=450ppm-400ppm=50ppm<br>· CORRECTED FIRST SWITCHING THRESHOLD=FIRST SWITCHING THRESHOLD+DIFFERENCE $\alpha$ =700ppm+50ppm=750ppm<br>· CORRECTED SECOND SWITCHING THRESHOLD=SECOND SWITCHING THRESHOLD+DIFFERENCE $\alpha$ =800ppm+50ppm=850ppm |
|---|---|---|
| LOWER THAN 750ppm | LOW | |
| 750ppm OR HIGHER AND LOWER THAN 850ppm | MEDIUM | |
| 850ppm OR HIGHER | HIGH | |

FIG.6

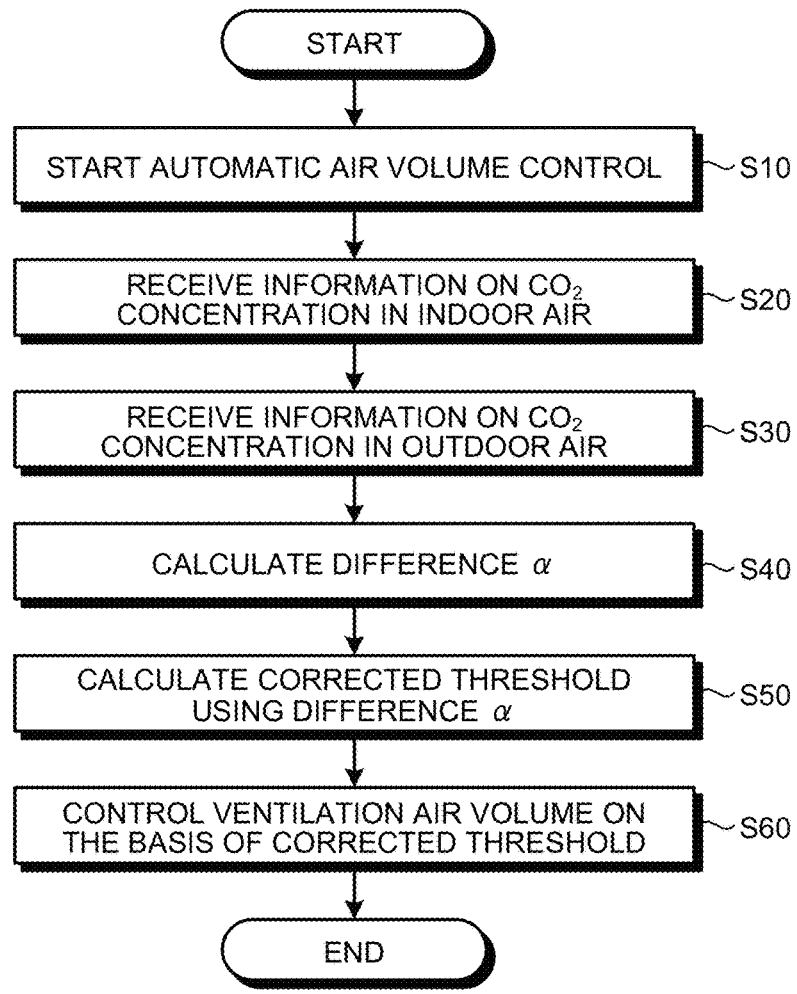

FIG.7

| $CO_2$ CONCENTRATION IN INDOOR AIR | VENTILATION AIR VOLUME | |
|---|---|---|
| LOWER THAN 740ppm | LOW | · REFERENCE OUTDOOR AIR $CO_2$ CONCENTRATION VALUE=400ppm<br>· DETECTED OUTDOOR AIR $CO_2$ CONCENTRATION VALUE=450ppm<br>· DIFFERENCE $\alpha$ =450ppm−400ppm=50ppm<br>· COEFFICIENT $\beta$ =0.8<br>· CORRECTED FIRST SWITCHING THRESHOLD=FIRST SWITCHING THRESHOLD+DIFFERENCE $\alpha$ ×COEFFICIENT $\beta$<br>=700ppm+50ppm×0.8=740ppm<br>· CORRECTED SECOND SWITCHING THRESHOLD=SECOND SWITCHING THRESHOLD+DIFFERENCE $\alpha$ ×COEFFICIENT $\beta$<br>=800ppm+50ppm×0.8=840ppm |
| 740ppm OR HIGHER AND LOWER THAN 840ppm | MEDIUM | |
| 840ppm OR HIGHER | HIGH | |

FIG.8

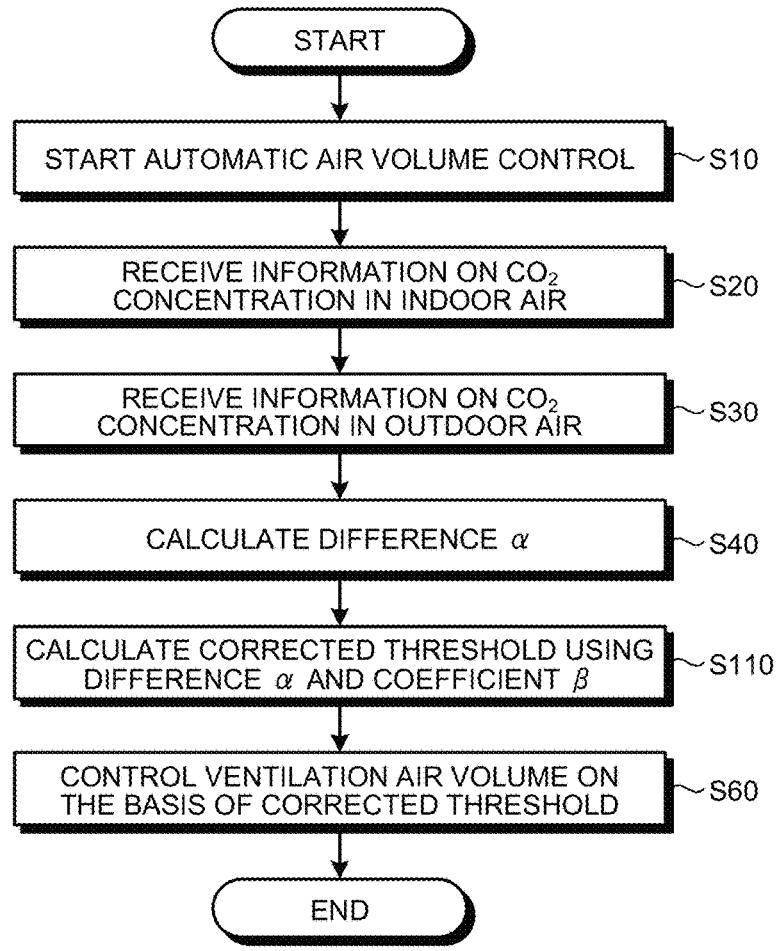

FIG.9

| CO₂ CONCENTRATION IN INDOOR AIR | VENTILATION AIR VOLUME | |
|---|---|---|
| LOWER THAN 750ppm | LOW | · REFERENCE OUTDOOR AIR $CO_2$ CONCENTRATION VALUE=400ppm<br>· DETECTED OUTDOOR AIR $CO_2$ CONCENTRATION VALUE=450ppm<br>· DIFFERENCE $\alpha$ =450ppm−400ppm=50ppm<br>· COEFFICIENT $\beta$ =0.8<br>· CORRECTED FIRST SWITCHING THRESHOLD=FIRST SWITCHING THRESHOLD+DIFFERENCE $\alpha$ =700ppm+50ppm=750ppm<br>· CORRECTED SECOND SWITCHING THRESHOLD=SECOND SWITCHING THRESHOLD+DIFFERENCE $\alpha$ ×COEFFICIENT $\beta$ =800ppm+50ppm×0.8=840ppm |
| 750ppm OR HIGHER AND LOWER THAN 840ppm | MEDIUM | |
| 840ppm OR HIGHER | HIGH | |

FIG.10

| CO₂ CONCENTRATION IN INDOOR AIR | VENTILATION AIR VOLUME | |
|---|---|---|
| LOWER THAN 750ppm | LOW | · REFERENCE OUTDOOR AIR $CO_2$ CONCENTRATION VALUE=400ppm<br>· DETECTED OUTDOOR AIR $CO_2$ CONCENTRATION VALUE=450ppm<br>· DIFFERENCE $\alpha$ =450ppm−400ppm=50ppm<br>· CORRECTED FIRST SWITCHING THRESHOLD=FIRST SWITCHING THRESHOLD+DIFFERENCE $\alpha$ =700ppm+50ppm=750ppm<br>· SECOND SWITCHING THRESHOLD=800ppm |
| 750ppm OR HIGHER AND LOWER THAN 800ppm | MEDIUM | |
| 800ppm OR HIGHER | HIGH | |

VENTILATOR THAT DETECTS INDOOR AND OUTDOOR CO2 CONCENTRATIONS AND VENTILATION CONTROL METHOD

FIELD

The present invention relates to a ventilator and a ventilation control method for performing ventilation on the basis of carbon dioxide concentration in indoor air.

BACKGROUND

Conventionally, in order to reduce the energy used by an air conditioner and also perform comfortable air conditioning, there has been used a heat exchange ventilator that allows for heat exchange between supply air and exhaust air to reduce a temperature difference between the supply air and the exhaust air and guide the supply air into a room, the supply air being introduced into the room from the outside of the room by a supply blower, and the exhaust air being discharged from the room to the outside of the room by an exhaust blower.

In an office building or the like, the degree of air pollution in a room varies greatly in response to an increase or decrease in the number of people in the room. Air pollution in a room is generally represented by carbon dioxide ($CO_2$) concentration. Normally, the ventilation in the office building or the like is designed such that the $CO_2$ concentration in the room is lower than or equal to a certain value with an occupancy rate of the room being 100%. In most cases, however, the actual occupancy rate of a room is 60% to 70% according to a survey in literature or the like.

Moreover, the heat exchange ventilator is often used while the ventilation air volume is fixed at a certain air volume by a remote control installed on a wall surface, for example. This results in a problem of air pollution in a room when many people are in the room. In addition, over-ventilation when there are only a few people or no people in the room during early morning and night hours causes an increase in the air conditioning load and is not preferable in terms of energy saving.

Given this situation, Patent Literature 1 discloses an air-conditioning ventilator that includes a $CO_2$ sensor for detecting $CO_2$ gas in a room and controls the air volume of a heat exchange ventilator on the basis of $CO_2$ concentration in the room.

There are two reasons for performing ventilation on the basis of the $CO_2$ concentration in the room. The first reason is that a high concentration of $CO_2$ is harmful to the human body, and thus the $CO_2$ concentration in the room is to be managed to a concentration that is not harmful to the human body. The second reason is that other harmful substances besides $CO_2$ that are present and generated in proportion to the amount of human activity are not easily detected, and thus the $CO_2$ concentration that is easily detected is detected as a representative harmful substance generated in proportion to the amount of human activity. The ventilation based on the $CO_2$ concentration in the room has been performed in consideration of the above two points.

CITATION LIST

Patent Literature

Patent Literature 1: Japanese Patent Application Laid-open No. H9-159208

SUMMARY

Technical Problem

The $CO_2$ concentration in the room is stable at the same level as the $CO_2$ concentration in the outdoor air when there is no one in the room. Therefore, when the $CO_2$ concentration in the outdoor air changes, the $CO_2$ concentration in the unoccupied room also changes in the same manner.

The air-conditioning ventilator described in Patent Literature 1 controls the ventilation air volume only in accordance with the $CO_2$ concentration in the room. Accordingly, even when the $CO_2$ concentration in the outdoor air has changed, the ventilation air volume is switched at the time the $CO_2$ concentration in the room has reached a fixed specific $CO_2$ concentration. Therefore, when the $CO_2$ concentration in the outdoor air is high, the ventilation air volume is switched with a smaller amount of human activity than when the $CO_2$ concentration in the outdoor air is low. The air-conditioning ventilator described in Patent Literature 1 thus has had a problem in that an appropriate ventilation air volume corresponding to the amount of human activity cannot be obtained when the $CO_2$ concentration in the outdoor air changes.

The present invention has been made in view of the above, and an object of the present invention is to provide a ventilator that can maintain an appropriate ventilation air volume corresponding to an amount of human activity even when $CO_2$ concentration in the outdoor air changes.

Solution to Problem

In order to solve the above-mentioned problems and achieve the object, a ventilator according to the present invention includes: a blower unit to exchange indoor air; a corrected threshold calculation unit to calculate a corrected threshold by correcting a predetermined threshold of $CO_2$ concentration in the indoor air for changing a ventilation air volume on a basis of a detected outdoor air $CO_2$ concentration value that is $CO_2$ concentration in outdoor air detected; and a ventilation air volume control unit to change the ventilation air volume by controlling an air volume of the blower unit on a basis of the $CO_2$ concentration in the indoor air and the corrected threshold.

Advantageous Effects of Invention

The ventilator according to the present invention has an effect of being able to maintain the appropriate ventilation air volume corresponding to the amount of human activity even when the $CO_2$ concentration in the outdoor air changes.

BRIEF DESCRIPTION OF DRAWINGS

FIG. 5 is a table illustrating a relationship between a corrected threshold and the ventilation air volume in a first control example by the ventilator according to the first embodiment of the present invention.

FIG. 6 is a flowchart illustrating an example of a procedure for automatic air volume control in the first control example by the ventilator according to the first embodiment of the present invention.

FIG. 7 is a table illustrating a relationship between a corrected threshold and the ventilation air volume in a second control example by the ventilator according to the first embodiment of the present invention.

FIG. 8 is a flowchart illustrating an example of a procedure for automatic air volume control in the second control example by the ventilator according to the first embodiment of the present invention.

FIG. 9 is a table illustrating a relationship between a corrected threshold and the ventilation air volume in a third control example by the ventilator according to the first embodiment of the present invention.

FIG. 10 is a table illustrating a relationship between a corrected threshold and the ventilation air volume in a fourth control example by the ventilator according to the first embodiment of the present invention.

DESCRIPTION OF EMBODIMENTS

A ventilator and a ventilation control method according to embodiments of the present invention will now be described in detail with reference to the drawings. Note that the present invention is not limited to the embodiments.

First Embodiment

Figure 1:
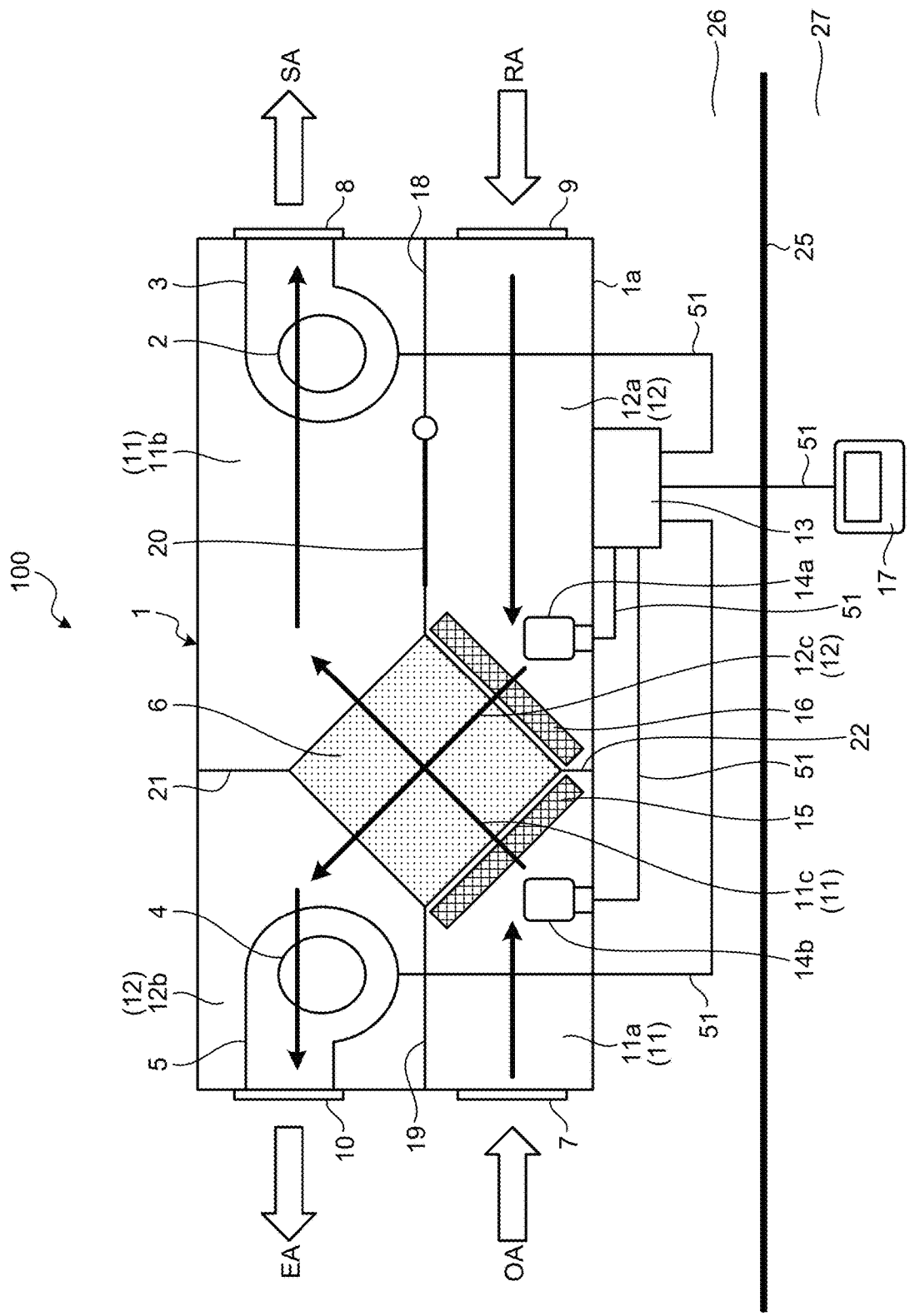
FIG. 1 is a schematic diagram illustrating a simplified configuration of a ventilator according to a first embodiment of the present invention.
Figure 2:
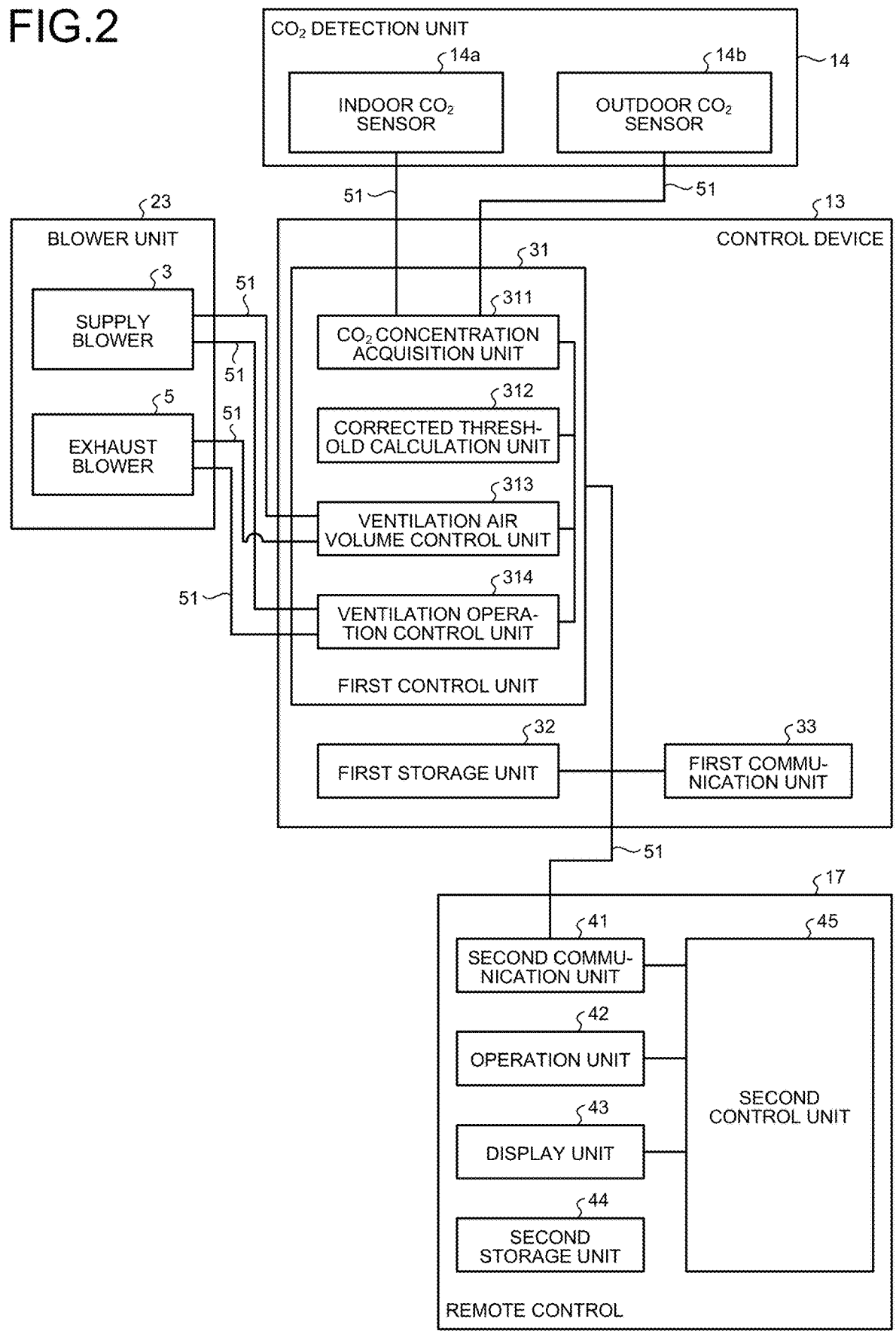
FIG. 2 is a diagram illustrating a functional configuration related to the operation of the ventilator according to the first embodiment of the present invention.

FIG. 1 is a schematic diagram illustrating a simplified configuration of a ventilator 100 according to a first embodiment of the present invention. Note that a reference character "OA" indicates outdoor air, a reference character "SA" indicates supply air, a reference character "RA" indicates return air, and a reference character "EA" indicates exhaust air. FIG. 2 is a diagram illustrating a functional configuration related to the operation of the ventilator 100 according to the first embodiment of the present invention.

The ventilator 100 illustrated in FIG. 1 includes a main body 1, a control device 13, and a remote control 17. The main body 1 is a heat exchange ventilator that is a ventilator for air conditioning with a heat exchange element 6 included in a housing 1a of a rectangular parallelepiped shape made of sheet metal. The main body 1 is installed while being concealed in a ceiling space 26. The remote control 17 is installed in a room 27. In FIG. 1, the area above a ceiling 25 is the ceiling space 26, and the area below the ceiling 25 is the room 27.

In addition to the heat exchange element 6 described above, the main body 1 includes an exhaust air outlet 10 and an outdoor air inlet 7 that are vertically arranged side by side on one end surface of the housing 1a in a longitudinal direction, and a supply air outlet 8 and an indoor air inlet 9 that are vertically arranged side by side on another end surface facing the one end surface of the housing 1a in the longitudinal direction. The main body 1 includes a supply air duct 11 connecting the outdoor air inlet 7 and the supply air outlet 8 via the heat exchange element 6, and an exhaust air duct 12 connecting the indoor air inlet 9 and the exhaust air outlet 10 via the heat exchange element 6.

The main body 1 includes, in the supply air duct 11, a supply blower 3 that generates a stream of supply airflow from an inlet end to an outlet end of the supply air duct 11, that is, a stream of supply airflow from the outdoor air inlet 7 to the supply air outlet 8. The main body 1 also includes, in the exhaust air duct 12, an exhaust blower 5 that generates a stream of exhaust airflow from an inlet end to an outlet end of the exhaust air duct 12, that is, a stream of exhaust airflow from the indoor air inlet 9 to the exhaust air outlet 10. The supply blower 3 and the exhaust blower 5 constitute a blower unit 23 that performs indoor air ventilation.

The main body 1 further includes an indoor $CO_2$ sensor 14a as a first $CO_2$ sensor that detects carbon dioxide ($CO_2$) concentration in the indoor air, and an outdoor $CO_2$ sensor 14b as a second $CO_2$ sensor that detects $CO_2$ concentration in the outdoor air. The indoor $CO_2$ sensor 14a and the outdoor $CO_2$ sensor 14b constitute a $CO_2$ detection unit 14 that detects the $CO_2$ concentration in the indoor air and the $CO_2$ concentration in the outdoor air.

The supply air duct 11 is the air duct for supplying the outdoor air OA into the room and includes a pre-heat exchange outdoor air duct 11a formed between the outdoor air inlet 7 and the heat exchange element 6, a post-heat exchange outdoor air duct 11b formed between the heat exchange element 6 and the supply air outlet 8, and an intra-element supply air duct 11c being the supply air duct 11 inside the heat exchange element 6. The exhaust air duct 12 is the air duct for exhausting the return air RA that is the indoor air to the outside of the room, and includes a pre-heat exchange indoor air duct 12a formed between the indoor air inlet 9 and the heat exchange element 6, a post-heat exchange indoor air duct 12b formed between the heat exchange element 6 and the exhaust air outlet 10, and an intra-element exhaust air duct 12c being the exhaust air duct 12 inside the heat exchange element 6. With this configuration, the supply air duct 11 and the exhaust air duct 12 cross in the heat exchange element 6.

The post-heat exchange outdoor air duct 11b and the post-heat exchange indoor air duct 12b are partitioned by the heat exchange element 6 and a partition wall 21. The pre-heat exchange outdoor air duct 11a and the pre-heat exchange indoor air duct 12a are partitioned by the heat exchange element 6 and a partition wall 22. The pre-heat exchange outdoor air duct 11a and the post-heat exchange indoor air duct 12b are partitioned by the heat exchange element 6 and a partition wall 19. The post-heat exchange outdoor air duct 11b and the pre-heat exchange indoor air duct 12a are partitioned by the heat exchange element 6 and a partition wall 18.

On the partition wall 18, an air duct switching damper 20 is arranged as an opening/closing portion for opening/closing an opening that allows a region in the post-heat exchange outdoor air duct 11b upstream of the supply blower 3, that is, a region between the heat exchange element 6 and the supply blower 3 in the post-heat exchange outdoor air duct 11b, to communicate with the pre-heat exchange indoor air duct 12a.

The supply blower 3 is connected to the supply air outlet 8 in the post-heat exchange outdoor air duct 11b and includes a supply motor 2 inside for driving the supply blower 3. The exhaust blower 5 is connected to the exhaust air outlet 10 in the post-heat exchange indoor air duct 12b and includes an exhaust motor 4 inside for driving the exhaust blower 5. The rotational speeds of the supply motor 2 and the exhaust motor 4 change according to control by a first control unit 31 described later.

In order to prevent reduction in the performance of the heat exchange element 6 due to clogging with dust contained in the outdoor air OA, a supply air filter 15 is detachably installed in the pre-heat exchange outdoor air duct 11a of the supply air duct 11, the supply air filter 15 being an air filter that removes the dust from the outdoor air OA sucked into the heat exchange element 6. That is, the supply air filter 15 is installed upstream of the heat exchange element 6 in the supply air duct 11. Moreover, in order to prevent reduction in the performance of the heat exchange element 6 due to clogging with dust contained in the return air RA, an exhaust air filter 16 is detachably installed in the pre-heat exchange indoor air duct 12a of the exhaust air duct 12, the exhaust air filter 16 being an air filter that removes the dust from the return air RA sucked into the heat exchange element 6. That is, the exhaust air filter 16 is installed upstream of the heat exchange element 6 in the exhaust air duct 12.

The heat exchange element 6 as a total heat exchanger includes the intra-element supply air duct 11c and the intra-element exhaust air duct 12c formed independently of each other, the intra-element supply air duct 11c being a supply air duct of a plate shape having a multilayer structure of a corrugated sheet that is formed by bonding corrugated paper to flat paper, and the intra-element exhaust air duct 12c being an exhaust air duct of a plate shape having a multilayer structure of a corrugated sheet that is formed by bonding corrugated paper to flat paper. The intra-element supply air duct 11c and the intra-element exhaust air duct 12c cross in the heat exchange element 6. As a result, the heat exchange element 6 is capable of performing total heat exchange that exchanges heat and moisture between air flowing through the intra-element supply air duct 11c of the supply air duct 11 and air flowing through the intra-element exhaust air duct 12c of the exhaust air duct 12. In the first embodiment, the intra-element supply air duct 11c and the intra-element exhaust air duct 12c are placed orthogonal to each other in the heat exchange element 6. That is, in the heat exchange element 6, the direction of travel of the air flowing through the intra-element supply air duct 11c is orthogonal to the direction of travel of the air flowing through the intra-element exhaust air duct 12c.

The indoor $CO_2$ sensor 14a is installed in the pre-heat exchange indoor air duct 12a and detects $CO_2$ concentration in the room by detecting $CO_2$ concentration in the return air RA that is the indoor air flowing through the pre-heat exchange indoor air duct 12a. The indoor $CO_2$ sensor 14a can communicate with the control device 13 via a communication line 51, and transmits information on the $CO_2$ concentration in the indoor air detected to a $CO_2$ concentration acquisition unit 311 of the control device 13 described later.

By installing the indoor $CO_2$ sensor 14a inside the housing 1a and arranging the control device 13 near the housing 1a, the communication line 51 connecting the indoor $CO_2$ sensor 14a and the control device 13 can be reduced in length, and the construction cost can be reduced.

The outdoor $CO_2$ sensor 14b is installed in the pre-heat exchange outdoor air duct 11a and detects $CO_2$ concentration in the outdoor air by detecting $CO_2$ concentration in the outdoor air OA flowing through the pre-heat exchange outdoor air duct 11a. The outdoor $CO_2$ sensor 14b can communicate with the control device 13 via the communication line 51, and transmits information on the $CO_2$ concentration in the outdoor air detected to the $CO_2$ concentration acquisition unit 311 of the control device 13.

By installing the outdoor $CO_2$ sensor 14b inside the housing 1a and arranging the control device 13 near the housing 1a, the communication line 51 connecting the outdoor $CO_2$ sensor 14b and the control device 13 can be reduced in length, and the construction cost can be reduced.

As illustrated in FIG. 2, the control device 13 includes the first control unit 31 as a control unit that controls the supply blower 3 and the exhaust blower 5 to control the ventilation operation of the ventilator 100, and a first storage unit 32 that stores various information related to the control of the ventilation operation of the ventilator 100. The control device 13 also includes a first communication unit 33 that performs two-way communication with a second communication unit 41 of the remote control 17.

The first control unit 31 is arranged outside the housing 1a at a position where maintenance can be easily performed, and controls the operation of the supply blower 3 and the exhaust blower 5 of the blower unit 23 to control the ventilation operation. That is, the first control unit 31 can communicate with the supply blower 3 and the exhaust blower 5 via the communication lines 51, and controls the ventilation air volume by controlling the air volumes of the supply blower 3 and the exhaust blower 5. Specifically, the first control unit 31 receives the information on the $CO_2$ concentration in the indoor air transmitted from the indoor $CO_2$ sensor 14a and the information on the $CO_2$ concentration in the outdoor air transmitted from the outdoor $CO_2$ sensor 14b. The first control unit 31 then controls the operation of the ventilator 100 by changing the ventilation air volume on the basis of the $CO_2$ concentration values indicated by the information on the $CO_2$ concentration in the indoor air and the information on the $CO_2$ concentration in the outdoor air that have been received. That is, the first control unit 31 performs control to switch the operation of the ventilator 100 to an operation mode having a different ventilation air volume on the basis of the $CO_2$ concentrations in the indoor air and the outdoor air.

The first control unit 31 includes the $CO_2$ concentration acquisition unit 311, a corrected threshold calculation unit 312, a ventilation air volume control unit 313, and a ventilation operation control unit 314 as functional units for controlling running and stopping of the supply blower 3 and the exhaust blower 5 and for controlling the ventilation air volume by controlling the air volumes of the supply blower 3 and the exhaust blower 5.

The $CO_2$ concentration acquisition unit 311 acquires the $CO_2$ concentration in the indoor air and the $CO_2$ concentration in the outdoor air from the $CO_2$ detection unit 14. That is, the $CO_2$ concentration acquisition unit 311 receives, from the indoor $CO_2$ sensor 14a, a detected value of the $CO_2$ concentration in the indoor air detected by the indoor $CO_2$ sensor 14a. The $CO_2$ concentration acquisition unit 311 also receives, from the outdoor $CO_2$ sensor 14b, a detected value of the $CO_2$ concentration in the outdoor air detected by the outdoor $CO_2$ sensor 14b.

The corrected threshold calculation unit 312 calculates a corrected threshold by correcting a predetermined threshold of the $CO_2$ concentration in the indoor air for changing the ventilation air volume, on the basis of a detected outdoor air $CO_2$ concentration value that is the $CO_2$ concentration in the outdoor air detected by the outdoor $CO_2$ sensor 14b. A typical $CO_2$ concentration in the atmosphere, which is the $CO_2$ concentration in the outdoor air assumed in the ventilation operation of the ventilator 100, is defined as a "reference outdoor air $CO_2$ concentration value". The reference outdoor air $CO_2$ concentration value is a predetermined reference value of the $CO_2$ concentration in the outdoor air used for control in an automatic air volume control mode of the ventilator 100. The automatic air volume control mode is an operation mode that performs control to automatically switch the ventilation air volume on the basis of the $CO_2$ concentration in the indoor air and the $CO_2$ concentration in the outdoor air. The reference outdoor air $CO_2$ concentration value is stored in advance in the corrected threshold calculation unit 312. On the other hand, the $CO_2$ concentration in the outdoor air detected by the outdoor $CO_2$ sensor 14b during the ventilation operation is defined as the "detected outdoor air $CO_2$ concentration value".

The ventilation air volume control unit 313 changes the ventilation air volume by automatically controlling the air volume of the blower unit 23 on the basis of an operation mode selected on the remote control 17 by a user. The ventilation air volume control unit 313 can change the ventilation air volume by controlling the air volume of the blower unit 23 on the basis of the corrected threshold calculated by the corrected threshold calculation unit 312. That is, the ventilation air volume control unit 313 can change the ventilation air volume by controlling the air volume of the blower unit 23 on the basis of the magnitude relationship between the $CO_2$ concentration in the indoor air and the corrected threshold.

The ventilation operation control unit 314 controls the ventilation operation of the ventilator 100 by controlling running or stopping of the supply blower 3 and the exhaust blower 5 on the basis of an operation mode selected on the remote control 17 by a user. Note that the ventilation air volume control unit 313 and the ventilation operation control unit 314 may be configured as one operation control unit.

The ventilation operation control unit 314 controls the indoor $CO_2$ sensor 14a and the outdoor $CO_2$ sensor 14b via the $CO_2$ concentration acquisition unit 311 such that the $CO_2$ concentration acquisition unit 311 is caused to transmit the detected values of the $CO_2$ concentration when a user selects, on the remote control 17, the automatic air volume control mode as the operation mode that performs control to switch the ventilation air volume on the basis of the $CO_2$ concentration in the indoor air and the $CO_2$ concentration in the outdoor air. This control is performed while the operation mode of the ventilator 100 is set to the automatic air volume control mode. Note that the ventilation operation control unit 314 may directly control the indoor $CO_2$ sensor 14a and the outdoor $CO_2$ sensor 14b.

The ventilator 100 can perform operation at three levels of air volume, the operation including low air volume operation that performs operation with a low air volume being the lowest air volume, medium air volume operation that performs operation with a medium air volume higher than the low air volume, and high air volume operation that performs operation with a high air volume higher than the medium air volume. That is, the ventilation air volume control unit 313 can perform three-level air volume switching control among the low air volume operation, the medium air volume operation, and the high air volume operation.

The corrected threshold calculation unit 312 and the ventilation air volume control unit 313 store in advance a "first switching threshold" and a "second switching threshold" as predetermined "switching thresholds" for the ventilation air volume control unit 313 to determine whether or not to change the ventilation air volume of the ventilator 100. The first switching threshold is a switching threshold for determining whether or not to switch the ventilation air volume of the ventilator 100 between the low air volume and the medium air volume, and is a predetermined threshold of the $CO_2$ concentration in the indoor air for changing the ventilation air volume. The second switching threshold is a switching threshold for determining whether or not to switch the ventilation air volume of the ventilator 100 between the medium air volume and the high air volume, and is a predetermined threshold of the $CO_2$ concentration in the indoor air. That is, the ventilation air volume control unit 313 can switch the ventilation air volume of the ventilator 100 in stages to at least three levels by using a plurality of different predetermined thresholds of the $CO_2$ concentration in the indoor air as a plurality of predetermined thresholds being different. Note that the first switching threshold and the second switching threshold may be stored in the first storage unit 32.

When necessary, the first switching threshold and the second switching threshold can be changed to given values from the outside by using the remote control 17 or the like according to the installation environment of the ventilator 100. The first switching threshold and the second switching threshold are overwritten when changed.

The first storage unit 32 stores various information related to the operation of the ventilator 100. As the first storage unit 32, a non-volatile storage is used such that the stored information is not erased even when the energization for the ventilator 100 is cut off. The first storage unit 32 is implemented by a memory, for example.

The first communication unit 33 communicates with the second communication unit 41 of the remote control 17 via the communication line 51 to transmit and receive information.

Figures 3, 4:
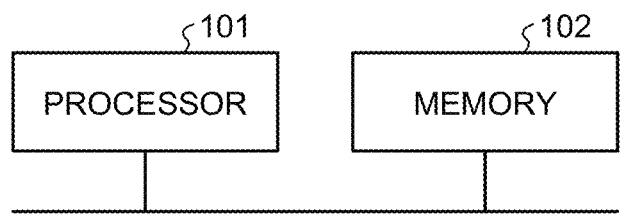
FIG. 3 is a diagram illustrating an example of a hardware configuration of processing circuitry in the first embodiment of the present invention.
FIG. 4 is a table illustrating a relationship between a threshold of $CO_2$ concentration in indoor air and a ventilation air volume before an automatic air volume control mode is implemented by the ventilator according to the first embodiment of the present invention.

The first control unit 31 is implemented as processing circuitry having a hardware configuration illustrated in FIG. 3, for example. FIG. 3 is a diagram illustrating an example of the hardware configuration of the processing circuitry according to the first embodiment of the present invention. When implemented as the processing circuitry illustrated in FIG. 3, the first control unit 31 is implemented by a processor 101 executing a program stored in a memory 102. Alternatively, a plurality of processors and a plurality of memories may cooperatively implement the above functions. Yet alternatively, some of the functions of the first control unit 31 may be implemented as an electronic circuit, and the other functions may be implemented by using the processor 101 and the memory 102.

Similarly, the first communication unit 33 may be implemented by the processor 101 executing a program stored in the memory 102. Alternatively, a plurality of processors and a plurality of memories may cooperatively implement the functions of the first communication unit 33. Yet alternatively, some of the functions of the first communication unit 33 may be implemented as an electronic circuit, and the other functions may be implemented by using the processor 101 and the memory 102.

Moreover, the processor and the memory for implementing the first communication unit 33 may be the same as or different from the processor and the memory for implementing the first control unit 31.

The remote control 17 receives commands regarding various controls such as a ventilation operation of the ventilator 100. The remote control 17 transmits various commands received from a user to the first control unit 31. That is, the remote control 17 can switch the operation between on and off, switch the ventilation air volume, switch a ventilation mode, and set an operation timer, and the like for the ventilator 100.

As illustrated in FIG. 2, the remote control 17 includes, as a main configuration, the second communication unit 41 that communicates with the first communication unit 33 via the communication line 51 to transmit and receive information, an operation unit 42 that receives a setting operation, a display unit 43 that displays various information related to the operation of the ventilator 100, a second storage unit 44 that stores various information related to the operation of the ventilator 100, and a second control unit 45 that controls the operation of the remote control 17. The second communication unit 41, the operation unit 42, the display unit 43, the second storage unit 44, and the second control unit 45 can transmit and receive information to and from one another.

The operation unit 42 is an interface for remotely controlling the operation of the ventilator 100, and receives a command related to the operation of the ventilator 100 from a user. The operation unit 42 is configured to allow the user to freely select various functions related to the operation of the ventilator 100 such as starting the operation of the ventilator 100, stopping the operation of the ventilator 100, selecting the operation mode of the ventilator 100, setting the operation intensity, and setting the timer. The operation unit 42 transmits various information received to the second control unit 45. The operation unit 42 is implemented by various known input devices such as a keyboard, a switch, a lever, or a touch panel.

The display unit 43 displays the various information received by the operation unit 42 and provides notification to the user. The display unit 43 is implemented by various known display devices such as a liquid crystal display device.

As the second storage unit 44, a non-volatile storage is used such that the stored information is not erased even when the energization for the ventilator 100 is cut off. The second storage unit 44 is implemented by a memory, for example.

The second control unit 45 controls the operation of the remote control 17 on the basis of command information received from the operation unit 42. The second control unit 45 transmits the information received from the operation unit 42 to the control device 13 via the second communication unit 41. The second control unit 45 also performs control to cause the display unit 43 to display various information.

The second control unit 45 is implemented as processing circuitry having the hardware configuration illustrated in FIG. 3, for example. When implemented as the processing circuitry illustrated in FIG. 3, the second control unit 45 is implemented by the processor 101 executing a program stored in the memory 102. Alternatively, a plurality of processors and a plurality of memories may cooperatively implement the above functions. Yet alternatively, some of the functions of the second control unit 45 may be implemented as an electronic circuit, and the other functions may be implemented by using the processor 101 and the memory 102.

Similarly, the second communication unit 41 may be implemented by the processor 101 executing a program stored in the memory 102. Alternatively, a plurality of processors and a plurality of memories may cooperatively implement the functions of the second communication unit 41. Yet alternatively, some of the functions of the second communication unit 41 may be implemented as an electronic circuit, and the other functions may be implemented by using the processor 101 and the memory 102. Moreover, the processor and the memory for implementing the second communication unit 41 may be the same as or different from the processor and the memory for implementing the second control unit 45.

Next, a description will be given of a first control example of ventilation air volume control by the ventilator 100 in the automatic air volume control mode. FIG. 4 is a table illustrating a relationship between a threshold of the $CO_2$ concentration in the indoor air and the ventilation air volume before the automatic air volume control mode is implemented by the ventilator 100 according to the first embodiment of the present invention. FIG. 5 is a table illustrating a relationship between a corrected threshold and the ventilation air volume in the first control example by the ventilator 100 according to the first embodiment of the present invention. FIG. 6 is a flowchart illustrating an example of a procedure for the automatic air volume control in the first control example by the ventilator 100 according to the first embodiment of the present invention.

First, when the automatic air volume control mode is selected by the operation unit 42 of the remote control 17 while the power of the ventilator 100 is turned on, command information for the automatic air volume control mode is transmitted to the first control unit 31 of the control device 13 via the second control unit 45, the second communication unit 41, the communication line 51, and the first communication unit 33 of the control device 13.

Upon receiving the command information for the automatic air volume control mode, the ventilation operation control unit 314 of the first control unit 31 starts the operation of the ventilator 100 in the automatic air volume control mode in step S10.

In the automatic air volume control mode, the indoor $CO_2$ sensor 14a starts a sensing operation for detecting the $CO_2$ concentration in the indoor air under the control of the ventilation operation control unit 314. At this time, it is preferable that the ventilator 100 performs the ventilation operation with the high air volume, which is the maximum air volume, such that the indoor $CO_2$ sensor 14a can stably detect the $CO_2$ concentration in the indoor air in a short time. Note that the ventilation air volume of the ventilator 100 is not limited to the high air volume as long as the $CO_2$ concentration in the indoor air can be detected by the indoor $CO_2$ sensor 14a.

Also, in the automatic air volume control mode, the outdoor $CO_2$ sensor 14b starts a sensing operation for detecting the $CO_2$ concentration in the outdoor air under the control of the ventilation operation control unit 314. At this time, it is preferable that the ventilator 100 performs the ventilation operation with the high air volume, which is the maximum air volume, such that the outdoor $CO_2$ sensor 14b can stably detect the $CO_2$ concentration in the outdoor air in a short time. Note that the ventilation air volume of the ventilator 100 is not limited to the high air volume as long as the CO$_2$ concentration in the outdoor air can be detected by the outdoor CO$_2$ sensor 14b.

In step S20, the CO$_2$ concentration acquisition unit 311 receives information on the CO$_2$ concentration in the indoor air, that is, information on the CO$_2$ concentration value in the indoor air, from the indoor CO$_2$ sensor 14a. The CO$_2$ concentration acquisition unit 311 transmits the information on the CO$_2$ concentration in the indoor air received to the corrected threshold calculation unit 312.

Next, in step S30, the CO$_2$ concentration acquisition unit 311 receives information on the CO$_2$ concentration in the outdoor air detected by the outdoor CO$_2$ sensor 14b, that is, information on the detected outdoor air CO$_2$ concentration value. The CO$_2$ concentration acquisition unit 311 transmits the information on the detected outdoor air CO$_2$ concentration value received to the corrected threshold calculation unit 312.

Here, it is assumed that the corrected threshold calculation unit 312 and the ventilation air volume control unit 313 store in advance 550 ppm as the default first switching threshold and 650 ppm as the default second switching threshold. It is then assumed that an administrator of the ventilator 100 considers the installation environment of the ventilator 100 and has changed the setting of the default first switching threshold to 700 ppm and the default second switching threshold to 800 ppm using the remote control 17. Accordingly, the following is a description of a case where the corrected threshold calculation unit 312 and the ventilation air volume control unit 313 store the first switching threshold of 700 ppm and the second switching threshold of 800 ppm.

When controlling the ventilation operation in a normal mode that is not the automatic air volume control mode in this state, the ventilation air volume control unit 313 controls the operation of the ventilator 100 by switching the ventilation air volume of the ventilator 100 on the basis of the magnitude relationship between the first and second switching thresholds changed as described above and the CO$_2$ concentration in the indoor air. That is, as illustrated in FIG. 4, the ventilation air volume control unit 313 performs the air volume switching control to operate the ventilator 100 with the low ventilation air volume when the CO$_2$ concentration in the indoor air is lower than 700 ppm, operate the ventilator 100 with the medium ventilation air volume when the CO$_2$ concentration in the indoor air is 700 ppm or higher and lower than 800 ppm, or operate the ventilator 100 with the high ventilation air volume when the CO$_2$ concentration in the indoor air is 800 ppm or higher.

As described above, the ventilator 100 is installed while being concealed in the ceiling 25, so that, when the operation of the ventilator 100 is stopped, there is no wind flowing through the ventilator 100. Moreover, the indoor CO$_2$ sensor 14a is installed in the pre-heat exchange indoor air duct 12a of the ventilator 100. Therefore, the indoor CO$_2$ sensor 14a cannot accurately detect the CO$_2$ concentration in the indoor air in the situation where the operation of the ventilator 100 is stopped with no wind flowing through the ventilator 100. In view of the above, the ventilation operation control unit 314 of the first embodiment performs control to cause the ventilator 100 to continue the operation with the low air volume, which is the minimum air volume, without causing the ventilator 100 to stop the operation even when the CO$_2$ concentration in the indoor air detected by the indoor CO$_2$ sensor 14a is low, that is, less than 700 ppm. As a result, the ventilator 100 can perform the sensing operation by the indoor CO$_2$ sensor 14a for detecting the CO$_2$ concentration in the indoor air at all times while the operation mode of the ventilator 100 is set to the automatic air volume control mode.

Note that as another example, when the CO$_2$ concentration in the indoor air detected by the indoor CO$_2$ sensor 14a is low, that is, less than 700 ppm, the ventilator 100 may operate not continuously but intermittently at regular intervals so that the indoor CO$_2$ sensor 14a may intermittently detect the CO$_2$ concentration in the room. In this case as well, the wind flows through the pre-heat exchange indoor air duct 12a intermittently, whereby the indoor CO$_2$ sensor 14a can accurately detect the CO$_2$ concentration in the indoor air intermittently. The wind also flows through the pre-heat exchange outdoor air duct 11a, whereby the outdoor CO$_2$ sensor 14b can accurately detect the CO$_2$ concentration in the outdoor air intermittently.

In the above ventilation air volume control, the first switching threshold and the second switching threshold are set on the assumption that the CO$_2$ concentration in the outdoor air is, for example, 400 ppm that is a typical CO$_2$ concentration value in the atmosphere. Similarly, the ventilation air volume for a room subjected to ventilation, which is a ventilation target space, is normally designed on the assumption that the CO$_2$ concentration in the outdoor air is 400 ppm that is the typical CO$_2$ concentration value in the atmosphere. The typical CO$_2$ concentration in the atmosphere of 400 ppm, which is the assumed CO$_2$ concentration in the outdoor air, is the aforementioned "reference outdoor air CO$_2$ concentration value".

Next, a description will be given of a step in which the corrected threshold calculation unit 312 automatically corrects the first switching threshold and the second switching threshold, which are the thresholds of the CO$_2$ concentration in the indoor air, on the basis of the detected outdoor air CO$_2$ concentration value that is the actual CO$_2$ concentration in the outdoor air detected by the outdoor CO$_2$ sensor 14b.

In step S40, the corrected threshold calculation unit 312 calculates a difference α between the detected outdoor air CO$_2$ concentration value and the reference outdoor air CO$_2$ concentration value. The difference α is calculated by the following expression (1).

$$\text{Difference } \alpha = \text{detected outdoor air } CO_2 \text{ concentration value} - \text{reference outdoor air } CO_2 \text{ concentration value} \tag{1}$$

When the reference outdoor air CO$_2$ concentration value is 400 ppm and the detected outdoor air CO$_2$ concentration value is 450 ppm, the difference α is calculated to be 50 ppm by the following calculation.

Difference α=detected outdoor air CO$_2$ concentration value−reference outdoor air CO$_2$ concentration value=450 ppm−400 ppm=50 ppm Next, in step S50, the corrected threshold calculation unit 312 calculates a corrected first switching threshold and a corrected second switching threshold that are the corrected thresholds obtained by correcting the thresholds of the CO$_2$ concentration in the indoor air, which are the switching thresholds, on the basis of the difference α. The corrected first switching threshold here is the first switching threshold after correction obtained by correcting the first switching threshold stored in the corrected threshold calculation unit 312 using the difference α. Likewise, the corrected second switching threshold here is the second switching threshold after correction obtained by correcting the second switching threshold stored in the corrected threshold calculation unit 312 using the difference α. That is, the corrected threshold calculation unit 312 calculates the corrected thresholds on the basis of a result of comparison between the reference outdoor air $CO_2$ concentration value and the detected outdoor air $CO_2$ concentration value. The corrected threshold calculation unit 312 transmits the corrected first switching threshold and the corrected second switching threshold calculated to the ventilation air volume control unit 313.

The corrected first switching threshold is calculated by the following expression (2) in which the difference α is added to the first switching threshold.

Corrected first switching threshold=first switching threshold+difference α (2)

The corrected second switching threshold is calculated by the following expression (3) in which the difference α is added to the second switching threshold.

Corrected second switching threshold=second switching threshold+difference α (3)

When the first switching threshold is 700 ppm, the corrected first switching threshold is calculated to be 750 ppm by the following calculation using expression (2).

Corrected first switching threshold=700 ppm+50 ppm=750 ppm

When the second switching threshold is 800 ppm, the corrected second switching threshold is calculated to be 850 ppm by the following calculation using expression (3).

Corrected second switching threshold=800 ppm+50 ppm=850 ppm

Next, in step S60, the ventilation air volume control unit 313 performs control to change the ventilation air volume, that is, control to switch the ventilation air volume, on the basis of the corrected thresholds calculated by the corrected threshold calculation unit 312. That is, the ventilation air volume control unit 313 does not perform control to switch the ventilation air volume between the low air volume and the medium air volume on the basis of the first switching threshold, but performs control to switch the ventilation air volume between the low air volume and the medium air volume on the basis of the corrected first switching threshold. Likewise, the ventilation air volume control unit 313 does not perform control to switch the ventilation air volume between the medium air volume and the high air volume on the basis of the second switching threshold, but performs control to switch the ventilation air volume between the medium air volume and the high air volume on the basis of the corrected second switching threshold.

That is, the ventilation air volume control unit 313 controls the operation of the ventilator 100 by switching the ventilation air volume of the ventilator 100 on the basis of the magnitude relationship between the corrected first and second switching thresholds corrected as described above and the $CO_2$ concentration in the indoor air detected by the indoor $CO_2$ sensor 14$a$. That is, the ventilation air volume control unit 313 performs the air volume switching control to operate the ventilator 100 with the low air volume when the $CO_2$ concentration in the indoor air is lower than 750 ppm, operate the ventilator 100 with the medium air volume when the $CO_2$ concentration in the indoor air is 750 ppm or higher and lower than 850 ppm, or operate the ventilator 100 with the high air volume when the $CO_2$ concentration in the indoor air is 850 ppm or higher.

Note that the corrected threshold calculation unit 312 and the ventilation air volume control unit 313 store the corrected first switching threshold and the corrected second switching threshold independently of the first switching threshold and the second switching threshold that are stored in the corrected threshold calculation unit 312 and the ventilation air volume control unit 313. Therefore, the corrected threshold calculation unit 312 and the ventilation air volume control unit 313 store the corrected first switching threshold and the corrected second switching threshold while the first switching threshold and the second switching threshold remain stored in the corrected threshold calculation unit 312 and the ventilation air volume control unit 313. The corrected first switching threshold and the corrected second switching threshold are overwritten with the latest values and saved each time the corrected first switching threshold and the corrected second switching threshold are calculated.

According to the automatic air volume control in the automatic air volume control mode as described above, when the $CO_2$ concentration in the outdoor air has changed from the reference outdoor air $CO_2$ concentration value, the corrected threshold calculation unit 312 calculates the corrected threshold on the basis of the difference in the $CO_2$ concentration in the outdoor air before and after the change. That is, the corrected threshold calculation unit 312 calculates the corrected threshold by reflecting the amount of fluctuation of the $CO_2$ concentration in the outdoor air in the threshold of the $CO_2$ concentration in the indoor air. For example, when the $CO_2$ concentration in the outdoor air has changed from 400 ppm, which is the typical $CO_2$ concentration in the outdoor air, to 450 ppm, the corrected threshold calculation unit 312 calculates the corrected first switching threshold of 750 ppm and the corrected second switching threshold of 850 ppm on the basis of 50 ppm that is the difference in the $CO_2$ concentration in the outdoor air before and after the change. Then, the ventilation air volume control unit 313 automatically changes the thresholds of the $CO_2$ concentration in the indoor air used for determining the switching of the ventilation air volume to the corrected first switching threshold and the corrected second switching threshold, and controls the ventilation operation of the ventilator 100. Therefore, when the $CO_2$ concentration in the outdoor air has fluctuated from the reference outdoor air $CO_2$ concentration value, the ventilator 100 automatically changes the threshold of the $CO_2$ concentration in the indoor air on the basis of the amount of fluctuation of the $CO_2$ concentration in the outdoor air from the reference outdoor air $CO_2$ concentration value.

According to the Society of Heating, Air-Conditioning and Sanitary Engineers of Japan Standard (SHASE-S), the ventilation requirements in SHASE-S 102 specify the $CO_2$ concentration as a single index to be 3500 ppm or lower in consideration of the impact on health. Therefore, if the $CO_2$ concentration in the indoor air is 3500 ppm or lower, in general, it is important to secure the ventilation air volume corresponding to the amount of human activity obtained by detecting the amount of $CO_2$ generated in the room by human activity, rather than detecting an absolute value of the $CO_2$ concentration value in the indoor air. It can be said that the amount of $CO_2$ generated in the indoor air by human activity is almost equal to the amount of change in the $CO_2$ concentration in the room.

Moreover, the $CO_2$ concentration in the outdoor air is, for example, 500 ppm higher than the typical 400 ppm in some places such as near a highway where many automobiles pass. In this case, the $CO_2$ concentration in the indoor air before human activity occurs is also 500 ppm. Generally, in the ventilator, the $CO_2$ concentration in the indoor air for switching the air volume is set on the assumption that the outdoor air has the $CO_2$ concentration of 400 ppm that is the typical $CO_2$ concentration in the outdoor air. For this reason, the ventilator assuming the $CO_2$ concentration in the outdoor air to be 400 ppm ends up increasing the air volume by underestimating the increase in the $CO_2$ concentration in the indoor air due to human activity by 100 ppm. Increasing the ventilation air volume early itself is not a problem in terms of purifying the air, but, in terms of energy saving, more ventilation than necessary is performed for the amount of activity, whereby the energy consumption increases due to an increase in the load of the air conditioner and an increase in the load of the ventilator by the discharge of air-conditioned air in the room.

The ventilator 100 described above switches the ventilation air volume on the basis of the corrected thresholds, and can thus switch the ventilation air volume with the influence of the fluctuation of the $CO_2$ concentration in the outdoor air on the $CO_2$ concentration in the indoor air being excluded. That is, the ventilator 100 does not switch the ventilation air volume when the $CO_2$ concentration in the indoor air rises only due to the fluctuation of the $CO_2$ concentration in the outdoor air. Therefore, even when the $CO_2$ concentration in the outdoor air has changed from the reference outdoor air $CO_2$ concentration value, the ventilator 100 can switch the ventilation air volume in response to the fluctuation of the $CO_2$ concentration in the indoor air corresponding to the amount of human activity designed or set in advance, and can maintain an appropriate ventilation air volume corresponding to the amount of human activity designed or set in advance.

As a result, the ventilator 100 avoids performing ventilation with an unnecessarily high air volume at an early timing due to a change in the $CO_2$ concentration in the outdoor air. The ventilator 100 can thus prevent an increase in the load due to unnecessary ventilation operation, maintain appropriate energy management designed in advance, and achieve energy saving of the ventilator 100. Moreover, the ventilator 100 can prevent an increase in the load of another air conditioner due to ventilation with an unnecessarily high air volume by the ventilator 100 and can achieve energy saving of the other air conditioner, the other air conditioner being, for example, an air conditioner that performs air conditioning of the ventilation target space of the ventilator 100.

Also, the ventilator 100 switches the ventilation air volume on the basis of the corrected thresholds when the detected outdoor air $CO_2$ concentration value is 3500 ppm or lower, and thus can obtain the above effect by securing the ventilation air volume corresponding to the amount of human activity that is obtained by detecting the amount of $CO_2$ generated in the room due to human activity.

Next, a description will be given of a second control example of the ventilation air volume control by the ventilator 100 based on the $CO_2$ concentration in the indoor air. FIG. 7 is a table illustrating a relationship between a corrected threshold and the ventilation air volume in the second control example by the ventilator 100 according to the first embodiment of the present invention. FIG. 8 is a flowchart illustrating an example of a procedure for automatic air volume control in the second control example by the ventilator 100 according to the first embodiment of the present invention. The procedure for the automatic air volume control illustrated in the flowchart of FIG. 8 differs from the procedure for the automatic air volume control illustrated in the flowchart of FIG. 6 in that the corrected first switching threshold and the corrected second switching threshold as the corrected thresholds are calculated in step S110 instead of step S50. In the second control example, the conditions other than the processing in step S110 are the same as in the case of the first control example.

In step S110, the corrected threshold calculation unit 312 calculates the corrected first switching threshold and the corrected second switching threshold as the corrected thresholds by correcting the thresholds of the $CO_2$ concentration in the indoor air on the basis of the difference $\alpha$ and a coefficient $\beta$ ($0<\beta\leq1$). The corrected first switching threshold here is the first switching threshold after correction that is obtained by correcting the first switching threshold stored in the corrected threshold calculation unit 312 using the difference $\alpha$ and the coefficient $\beta$. Likewise, the corrected second switching threshold here is the second switching threshold after correction that is obtained by correcting the second switching threshold stored in the corrected threshold calculation unit 312 using the difference $\alpha$ and the coefficient $\beta$.

The coefficient $\beta$ ($0<\beta\leq1$) is a predetermined adjustment coefficient for adjusting the degree of correction when the threshold of the $CO_2$ concentration in the indoor air is corrected by the difference $\alpha$. The coefficient $\beta$ is stored in advance in the corrected threshold calculation unit 312. When necessary, the coefficient $\beta$ can be set and changed to a given value from the outside by using the remote control 17 or the like according to the installation environment of the ventilator 100. The coefficient $\beta$ is overwritten when changed.

The corrected first switching threshold in the second control example is calculated by the following expression (4) in which the value of (difference $\alpha$×coefficient $\beta$), which is a product of the difference $\alpha$ and the coefficient $\beta$, is added to the first switching threshold.

Corrected first switching threshold=first switching threshold+(difference $\alpha$×coefficient $\beta$)    (4)

The corrected second switching threshold in the second control example is calculated by the following expression (5) in which the value of (difference $\alpha$×coefficient $\beta$), which is the product of the difference $\alpha$ and the coefficient $\beta$, is added to the second switching threshold.

Corrected second switching threshold=second switching threshold+(difference $\alpha$×coefficient $\beta$)    (5)

As in the case of the first control example, when the reference outdoor air $CO_2$ concentration value is 400 ppm and the detected outdoor air $CO_2$ concentration value is 450 ppm, the difference $\alpha$ is 50 ppm. It is also assumed that the coefficient $\beta$ is set to 0.8. In this case, since the first switching threshold is 700 ppm, the corrected first switching threshold is 740 ppm according to the following calculation using expression (4).

Corrected first switching threshold=700 ppm+50 ppm×0.8=740 ppm

Also, since the second switching threshold is 800 ppm, the corrected second switching threshold is 840 ppm according to the following calculation using expression (5).

Corrected second switching threshold=800 ppm+50 ppm×0.8=840 ppm

Then, in step S60, the ventilation air volume control unit 313 performs control to switch the ventilation air volume on the basis of the corrected thresholds calculated. That is, the ventilation air volume control unit 313 controls the operation of the ventilator 100 by switching the ventilation air volume of the ventilator 100 on the basis of the magnitude relationship between the corrected first and second switching thresholds corrected as described above and the $CO_2$ concentration in the indoor air detected by the indoor $CO_2$ sensor 14a. The ventilation air volume control unit 313 thus changes the thresholds of the $CO_2$ concentration in the indoor air for automatically switching the air volume and controls the ventilation air volume with the corrected first switching threshold=740 ppm and the corrected second switching threshold=840 ppm. In this case, the ventilation air volume control unit 313 performs the air volume switching control to operate the ventilator 100 with the low air volume when the $CO_2$ concentration in the indoor air is lower than 740 ppm, operate the ventilator 100 with the medium air volume when the $CO_2$ concentration in the indoor air is 740 ppm or higher and lower than 840 ppm, or operate the ventilator 100 with the high air volume when the $CO_2$ concentration in the indoor air is 840 ppm or higher.

The second control example described above can obtain the effect similar to that in the case of the first control example. Moreover, in the second control example, the thresholds of the $CO_2$ concentration in the indoor air are corrected by the value obtained by multiplying the difference $\alpha$ by the coefficient $\beta$ as described above. As a result, even when the $CO_2$ concentration in the outdoor air changes from the reference outdoor air $CO_2$ concentration value, the value of the corrected threshold can be set lower than the case of the first control example in which the switching threshold is corrected by simply adding the difference $\alpha$ to the switching threshold. In this case, the smaller the coefficient $\beta$, the lower the corrected threshold.

The ventilator 100 uses the corrected first switching threshold and the corrected second switching threshold corrected by adding the value of (difference $\alpha \times$ coefficient $\beta$) to the switching thresholds, and can thus switch the ventilation air volume with the influence of the fluctuation of the $CO_2$ concentration in the outdoor air on the $CO_2$ concentration in the indoor air being reduced. In this case, the timing for switching the ventilation air volume is at the time point when the $CO_2$ concentration in the indoor air is lower than that in the case of the first control example, and is earlier than the case of the first control example. Therefore, the energy saving effect during the ventilation operation is slightly less than that in the case of the first control example. On the other hand, the corrected first switching threshold and the corrected second switching threshold are lower than those in the case of the first control example, so that ventilation can be performed to bring the $CO_2$ concentration in the room to a level lower than that in the case of the first control example, and the air in the room can be made cleaner. Therefore, as compared to the case of the first control example, the ventilator 100 can perform ventilation that achieves a balance between energy saving during the ventilation operation and prevention of an increase in the $CO_2$ concentration in the indoor air during the ventilation operation.

The air in the room is easily polluted when many people are in the room. In this case, it is preferable to reduce the coefficient $\beta$ and switch the ventilation air volume so as to increase the ventilation air volume early at the stage when the increase in the $CO_2$ concentration in the indoor air is small. The air in the room is not easily polluted or not polluted when only a few people or no people are in the room. In this case, it is preferable to increase the coefficient $\beta$ and switch the ventilation air volume so as to increase the ventilation air volume at the stage when the degree of increase in the $CO_2$ concentration in the indoor air is close to the degree of increase in the $CO_2$ concentration in the indoor air corresponding to the amount of human activity based on the initial ventilation design or setting. The second control example sets the coefficient $\beta$ to the appropriate value according to the situation in the room or the like as described above, so that, as compared to the case of the first control example, it is possible to perform ventilation that achieves a balance between energy saving during the ventilation operation and prevention of an increase in the $CO_2$ concentration in the indoor air during the ventilation operation.

Moreover, in the first control example described above, the corrected thresholds are calculated by adding the difference $\alpha$ to both the first switching threshold and the second switching threshold, and correcting both the first switching threshold and the second switching threshold by the same amount of correction. Furthermore, in the second control example described above, the corrected thresholds are calculated by adding the value of (difference $\alpha \times$ coefficient $\beta$) to both the first switching threshold and the second switching threshold, and correcting both the first switching threshold and the second switching threshold by the same amount of correction. That is, in the first control example and the second control example, the corrected thresholds are calculated by changing both the first switching threshold and the second switching threshold by the same amount of correction. On the other hand, the amount of correction in calculating the corrected thresholds may be different between the first switching threshold and the second switching threshold.

FIG. 9 is a table illustrating a relationship between a corrected threshold and the ventilation air volume in a third control example by the ventilator 100 according to the first embodiment of the present invention. In the third control example, a description will be given of a case where the amount of correction in calculating the corrected thresholds is different between the first switching threshold and the second switching threshold. For example, the first switching threshold is corrected by adding the difference $\alpha$. On the other hand, the second switching threshold is corrected by adding the value of (difference $\alpha \times$ coefficient $\beta$). That is, the corrected threshold calculation unit 312 calculates the corrected threshold by adding the difference $\alpha$ to the predetermined threshold for a part of a plurality of different predetermined thresholds of the $CO_2$ concentration in the indoor air, and calculates the corrected threshold by adding the product of the coefficient $\beta$ and the difference $\alpha$ to the predetermined threshold for another part of the plurality of different predetermined thresholds of the $CO_2$ concentration in the indoor air.

By using the corrected first switching threshold that is corrected by adding the difference $\alpha$ to the first switching threshold, as in the case of the first control example, the ventilator 100 can maintain an appropriate ventilation air volume corresponding to the amount of human activity based on the initial ventilation design or setting until the $CO_2$ concentration in the indoor air reaches the corrected first switching threshold. As a result, the ventilator 100 can prevent an unnecessary increase in the load of the ventilator 100 and another air conditioner such as an air conditioner that performs air conditioning of the ventilation target space of the ventilator 100.

Moreover, by using the corrected second switching threshold corrected by adding the value of (difference $\alpha \times$ coefficient $\beta$) to the second switching threshold, the ventilator 100 can switch the ventilation air volume with the influence of the fluctuation of the $CO_2$ concentration in the outdoor air on the $CO_2$ concentration in the indoor air being reduced. In this case, the timing for switching to the high air volume operation is at the point when the $CO_2$ concentration in the indoor air is lower than that in the case of the first control example, and is earlier than the case of the first control example. Therefore, the energy saving effect during the ventilation operation is slightly less than that in the case of the first control example. On the other hand, since the corrected second switching threshold is lower than that in the case of the first control example, the ventilation can be performed to bring the $CO_2$ concentration in the room to a level lower than that in the case of the first control example, and the air in the room can be made cleaner. Therefore, as compared to the case of the first control example, the ventilator 100 can perform ventilation that achieves a balance between energy saving during the ventilation operation and prevention of an increase in the $CO_2$ concentration in the indoor air during the ventilation operation.

Moreover, the value of the coefficient β applied in the correction may be changed for each of the first switching threshold and the second switching threshold. For example, a coefficient β1=0.8 may be set as the coefficient β applied to the correction of the first switching threshold, and a coefficient β2=0.7 may be set as the coefficient β applied to the correction of the second switching threshold. As in the case of the first control example, when the reference outdoor air $CO_2$ concentration value is 400 ppm and the detected outdoor air $CO_2$ concentration value is 450 ppm, the difference α is 50 ppm.

In this case, since the first switching threshold is 700 ppm, the corrected first switching threshold is 740 ppm according to the following calculation using expression (4).

Corrected first switching threshold=700 ppm+50 ppm× 0.8=740 ppm

Since the second switching threshold is 800 ppm, the corrected second switching threshold is 835 ppm according to the following calculation using expression (5).

Corrected second switching threshold=800 ppm+50 ppm×0.7=835 ppm

Initial values of the coefficient β, the coefficient β1, and the coefficient β2 are stored in advance in the corrected threshold calculation unit 312.

Moreover, the coefficient β, the coefficient β1, and the coefficient β2 can be set and changed to given values from outside the corrected threshold calculation unit 312 using the remote control 17 or the like by the administrator of the ventilator 100 when needed in designing the ventilation in the installation environment of the ventilator 100. When the coefficient β, the coefficient β1, and the coefficient β2 are changed from their initial values, the initial values may be overwritten with changed values, or the changed values may be stored in the corrected threshold calculation unit 312 while the initial values remain stored. Note that the coefficient β, the coefficient β1, and the coefficient β2 may be stored in the first storage unit 32.

FIG. 10 is a table illustrating a relationship between a corrected threshold and the ventilation air volume in a fourth control example by the ventilator 100 according to the first embodiment of the present invention. In the fourth control example, a description will be given of a case where the corrected threshold is calculated by correcting a part of the plurality of thresholds of the $CO_2$ concentration in the indoor air set for the ventilator 100, and the rest of the plurality of thresholds of the $CO_2$ concentration in the indoor air is not corrected. For example, the first switching threshold is corrected by adding the difference α. On the other hand, the second switching threshold is not corrected. That is, the corrected threshold calculation unit 312 calculates the corrected threshold by adding the difference α to the predetermined threshold for a part of a plurality of different predetermined thresholds of the $CO_2$ concentration in the indoor air, and does not correct another part of the plurality of different predetermined thresholds of the $CO_2$ concentration in the indoor air.

By correcting the first switching threshold by adding the difference α to the first switching threshold, as in the case of the first control example, the ventilator 100 can maintain an appropriate ventilation air volume corresponding to the amount of human activity based on the initial ventilation design or setting until the $CO_2$ concentration in the indoor air reaches the corrected first switching threshold. On the other hand, since the second switching threshold is not corrected, the $CO_2$ concentration in the indoor air corresponding to the initial ventilation design can be maintained. It is also needless to say that the first switching threshold may be corrected by the value of (difference α×coefficient β).

Note that the description has been given of the case where the reference outdoor air $CO_2$ concentration value is, for example, 400 ppm being the typical $CO_2$ concentration in the outdoor air and is a fixed value stored in advance in the corrected threshold calculation unit 312, but the reference outdoor air $CO_2$ concentration value is not limited to this. For example, the reference outdoor air $CO_2$ concentration value may be set to the $CO_2$ concentration in the outdoor air that is actually detected by the outdoor $CO_2$ sensor 14b in the installation environment of the ventilator 100 when the ventilator 100 is installed.

Moreover, the reference outdoor air $CO_2$ concentration value may be set and changed to a given value from outside the corrected threshold calculation unit 312 using the remote control 17 or the like by the administrator of the ventilator 100 when needed in designing the ventilation in the installation environment of the ventilator 100.

Moreover, although the description has been given of the case where the air volume of the ventilator 100 can be switched among the three levels including the low air volume, the medium air volume, and the high air volume by using the two switching thresholds, the number of levels of the air volume and the number of switching thresholds are not limited thereto.

Figure 11:
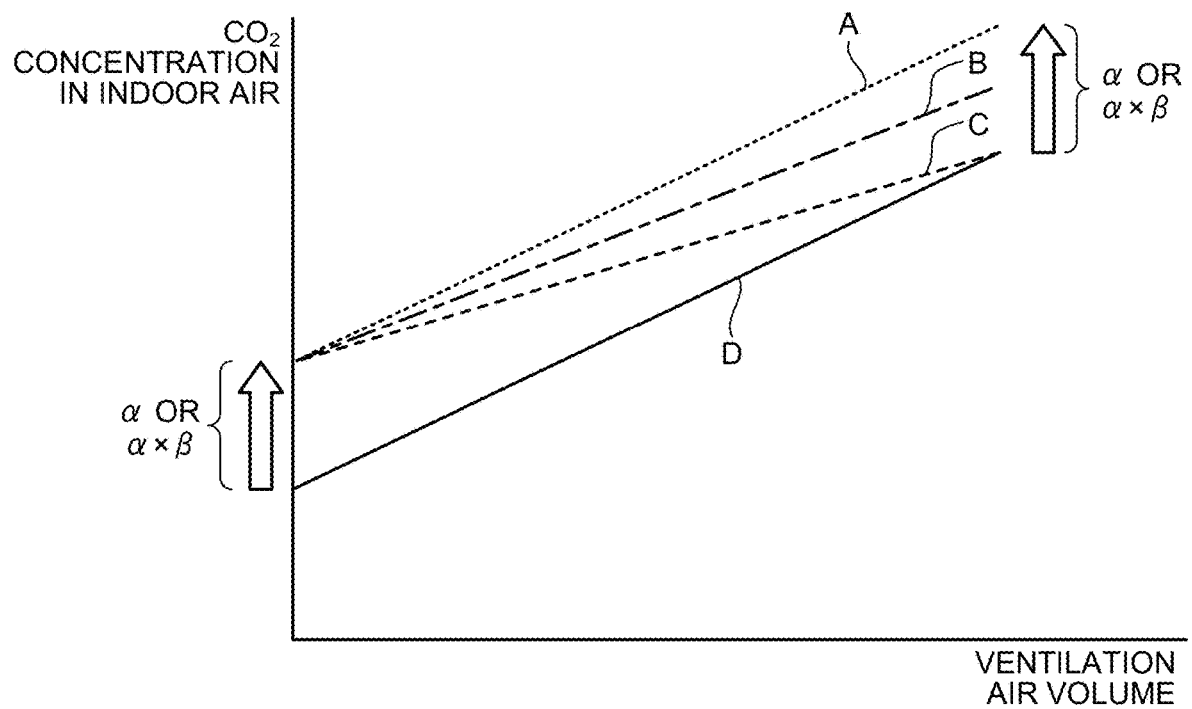
FIG. 11 is a characteristic chart illustrating another example of a mode of change in the ventilation air volume in the ventilator according to the first embodiment of the present invention.

Furthermore, although the description has been given of the case where the ventilation air volume is changed in stages on the basis of the $CO_2$ concentration in the indoor air, the mode of change in the ventilation air volume is not limited thereto. FIG. 11 is a characteristic chart illustrating another example of the mode of change in the ventilation air volume in the ventilator 100 according to the first embodiment of the present invention. FIG. 11 illustrates a correlation between the $CO_2$ concentration in the indoor air and the ventilation air volume in the ventilator 100. The ventilation air volume in the ventilator 100 may adopt the mode of change in which the ventilation air volume changes steplessly with respect to the $CO_2$ concentration in the indoor air, as illustrated in the characteristic chart of FIG. 11.

In this case, the $CO_2$ concentration in the indoor air, which is detected by the indoor $CO_2$ sensor 14a, itself corresponds to the threshold of the $CO_2$ concentration in the indoor air. The ventilator 100 may perform control to change the ventilation air volume steplessly with respect to the $CO_2$ concentration in the indoor air on the basis of the correlation between the $CO_2$ concentration in the indoor air and the ventilation air volume indicated by a plurality of characteristic lines in FIG. 11. A characteristic line D in FIG. 11 is a characteristic line indicating the correlation between the $CO_2$ concentration in the indoor air and the ventilation air volume in a default state.

A characteristic line A in FIG. 11 is a characteristic line that is obtained by translating and correcting the characteristic line D by the difference α or the value of (difference α×coefficient β), and indicates the correlation between the $CO_2$ concentration in the indoor air and the ventilation air volume.

A characteristic line B in FIG. 11 is a characteristic line that is obtained by correcting the characteristic line D by the difference α or the value of (difference α×coefficient β) with the amount of correction being smaller for the higher $CO_2$ concentration in the indoor air, and indicates the correlation between the $CO_2$ concentration in the indoor air and the ventilation air volume. That is, the characteristic line B has a smaller slope than the characteristic line D.

A characteristic line C in FIG. 11 is a characteristic line that is obtained by correcting the characteristic line D by the difference α or the value of (difference α×coefficient β) with the amount of correction being smaller for the higher $CO_2$ concentration in the indoor air and being smaller than that for the characteristic line B, and indicates the correlation between the $CO_2$ concentration in the indoor air and the ventilation air volume. That is, the characteristic line C has a smaller slope than the characteristic line B. Also, the characteristic line C is corrected so as not to change the air volume corresponding to the highest $CO_2$ concentration in the indoor air on the characteristic line D.

As described above, the ventilator 100 according to the first embodiment switches the ventilation air volume on the basis of the corrected thresholds, and can thus switch the ventilation air volume with the influence of the fluctuation of the $CO_2$ concentration in the outdoor air on the $CO_2$ concentration in the indoor air being excluded. As a result, even when the $CO_2$ concentration in the outdoor air has changed from the reference outdoor air $CO_2$ concentration value, the ventilator 100 can switch the ventilation air volume in response to the fluctuation of the $CO_2$ concentration in the indoor air corresponding to the amount of human activity designed or set in advance, and can maintain an appropriate ventilation air volume corresponding to the amount of human activity designed or set in advance.

Therefore, the ventilator 100 according to the first embodiment can perform ventilation while maintaining an appropriate ventilation air volume for the room even when the $CO_2$ concentration in the outdoor air has changed.

Second Embodiment

Figure 12:
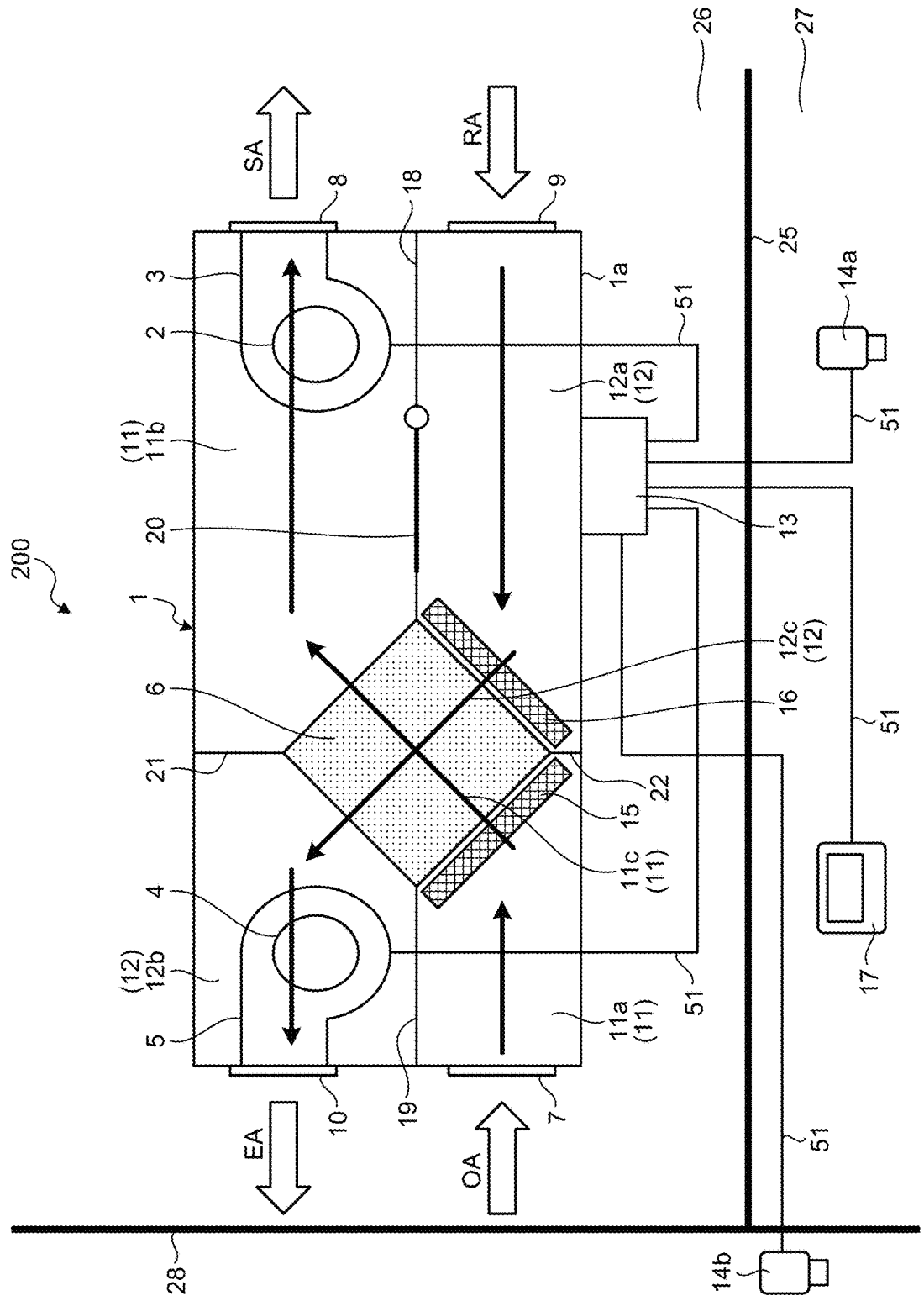
FIG. 12 is a schematic diagram illustrating a simplified configuration of a ventilator according to a second embodiment of the present invention.

FIG. 12 is a schematic diagram illustrating a simplified configuration of a ventilator 200 according to a second embodiment of the present invention. Note that in FIG. 12, parts similar to those in FIG. 1 described in the first embodiment are assigned the same reference numerals as those in FIG. 1.

The configuration of the ventilator 200 according to the second embodiment is different from the configuration of the ventilator 100 according to the first embodiment in that the indoor $CO_2$ sensor 14a is installed in the room 27, and the outdoor $CO_2$ sensor 14b is installed outside an outer wall 28 of the building, or outdoors. The other configurations and functions of the ventilator 200 are similar to those of the ventilator 100. Unlike the ventilator 100, the ventilator 200 has such a configuration to be able to accurately detect the $CO_2$ concentration in the indoor air and the $CO_2$ concentration in the outdoor air even when the ventilation operation of the ventilator 200 is stopped.

Moreover, the ventilator 200 may acquire the $CO_2$ concentration in the indoor air and the $CO_2$ concentration in the outdoor air from a device other than the ventilator 200. In this case, the ventilator 200 may not necessarily include the indoor $CO_2$ sensor 14a and the outdoor $CO_2$ sensor 14b, that is, the $CO_2$ detection unit 14. In this case as well, the ventilator 200 can accurately detect the $CO_2$ concentration in the indoor air and the $CO_2$ concentration in the outdoor air even when the ventilation operation of the ventilator 200 is stopped. The device other than the ventilator 200 is not particularly limited.

As described above, the ventilator 200 according to the second embodiment has the effect similar to that of the ventilator 100 according to the first embodiment.

Moreover, the ventilator 200 can accurately detect the $CO_2$ concentration in the indoor air and the $CO_2$ concentration in the outdoor air even when the ventilation operation of the ventilator 200 is stopped. Therefore, the ventilator 200 does not need to perform the continuous or intermittent ventilation operation for the sensing operation in which the ventilator 100 accurately detects the $CO_2$ concentration in the indoor air and the $CO_2$ concentration in the outdoor air. As a result, the ventilator 200 can further reduce the time of the ventilation operation and can increase the energy saving effect of the ventilator 200. Moreover, by the reduction in the outdoor air load, the ventilator 200 can increase the energy saving effect of another air conditioner such as an air conditioner that performs air conditioning of the ventilation target space of the ventilator 200.

Third Embodiment

Figure 13:
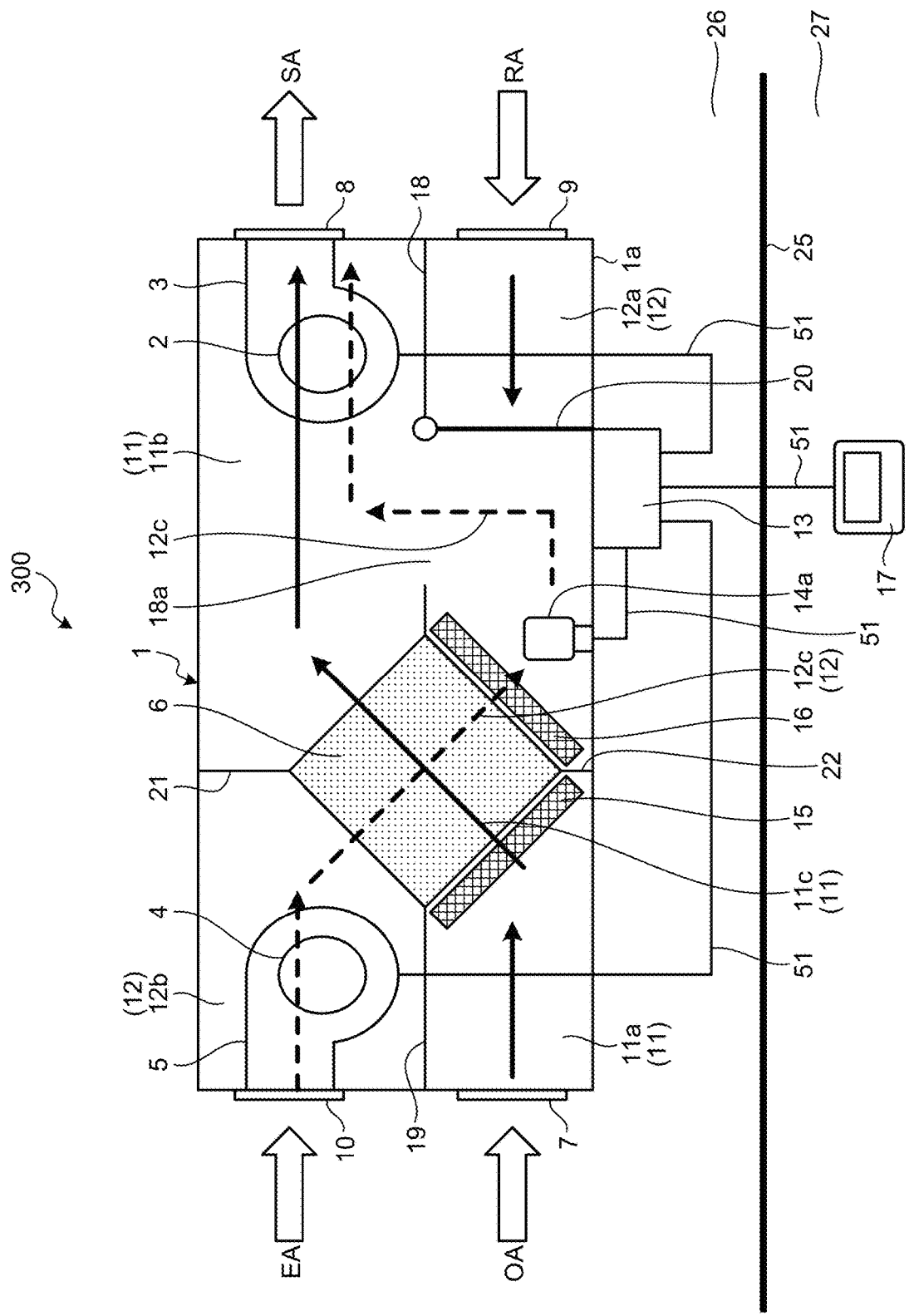
FIG. 13 is a schematic diagram illustrating a simplified configuration of a ventilator according to a third embodiment of the present invention.
Figure 14:
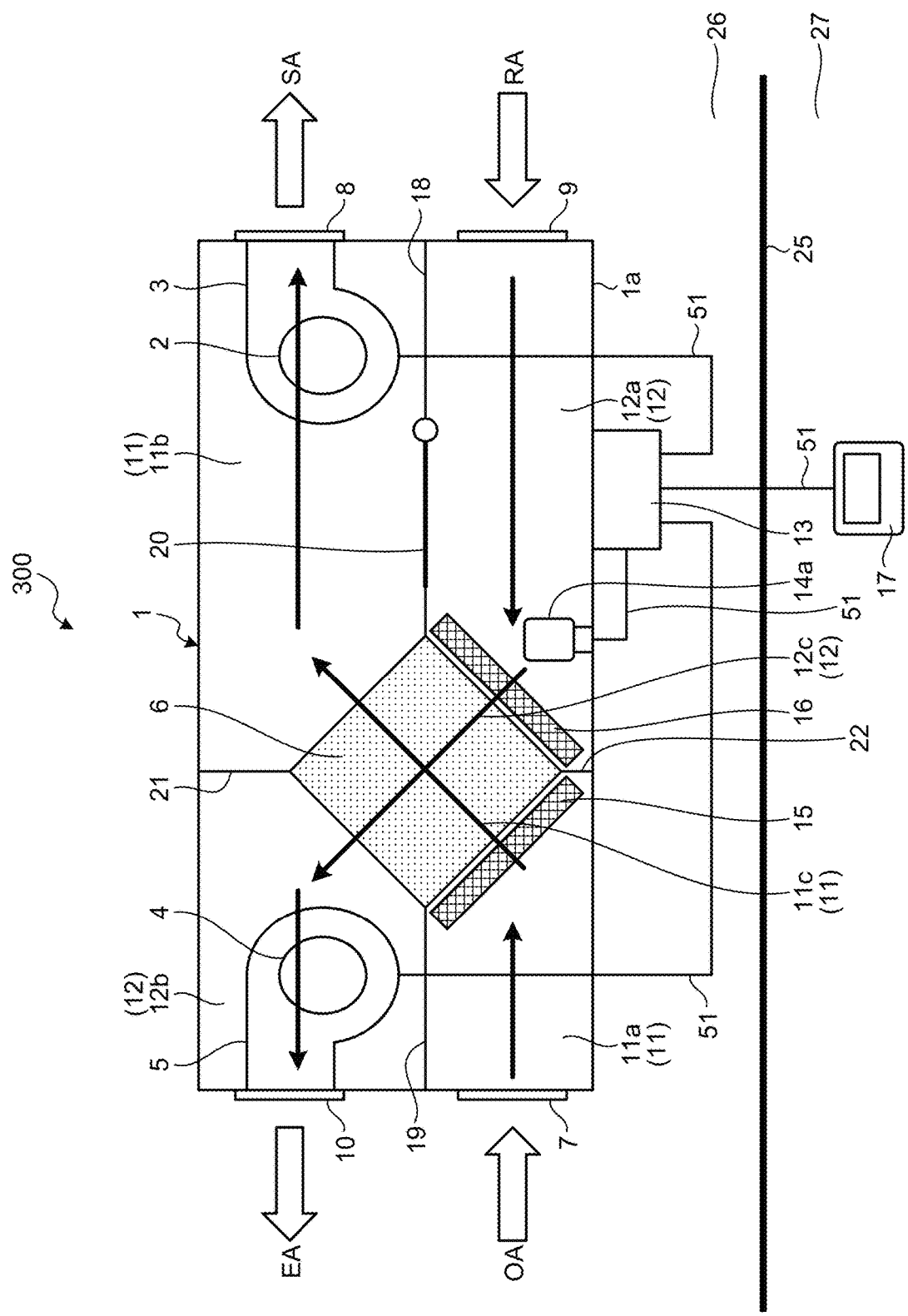
FIG. 14 is a schematic diagram illustrating the simplified configuration of the ventilator according to the third embodiment of the present invention.

FIG. 13 is a schematic diagram illustrating a simplified configuration of a ventilator 300 according to a third embodiment of the present invention. FIG. 14 is a schematic diagram illustrating the simplified configuration of the ventilator 300 according to the third embodiment of the present invention. FIG. 13 illustrates a state in which the air duct switching damper 20 is placed at an open position. FIG. 14 illustrates a state in which the air duct switching damper 20 is placed at a closed position. Note that in FIGS. 13 and 14, parts similar to those in FIG. 1 described in the first embodiment are assigned the same reference numerals as those in FIG. 1.

The ventilator 300 according to the third embodiment does not include the outdoor $CO_2$ sensor 14b installed in the pre-heat exchange outdoor air duct 11a in the ventilator 100 according to the first embodiment. That is, in the ventilator 300, the $CO_2$ detection unit 14 includes one $CO_2$ sensor, or the indoor $CO_2$ sensor 14a. In the ventilator 300, the indoor $CO_2$ sensor 14a also functions as the outdoor $CO_2$ sensor 14b.

In the partition wall 18, an opening 18a is formed to allow a region in the post-heat exchange outdoor air duct 11b upstream of the supply blower 3, that is, a region between the heat exchange element 6 and the supply blower 3 in the post-heat exchange outdoor air duct 11b, to communicate with the pre-heat exchange indoor air duct 12a.

The air duct switching damper 20, which is the opening/closing portion for opening/closing the opening 18a, is arranged on the partition wall 18. The ventilator 300 can open and close the opening 18a by opening and closing the air duct switching damper 20.

The air duct switching damper 20 is made of a plate that turns about an axis along the partition wall 18, for example, and is driven by a motor (not shown) so that one end side of the damper is displaced into the pre-heat exchange indoor air duct 12a. The air duct switching damper 20 can be displaced to the open position at which the opening 18a is opened as illustrated in FIG. 13, and to the closed position at which the opening 18a is closed as illustrated in FIG. 14. When the air duct switching damper 20 is positioned at the open position, as illustrated in FIG. 13, the outdoor air flowing into the pre-heat exchange indoor air duct 12a via the post-heat exchange indoor air duct 12b and the heat exchange element 6 passes through the opening 18a and flows into the post-heat exchange outdoor air duct 11b. When the air duct switching damper 20 is positioned at the closed position, as illustrated in FIG. 14, the opening 18a is closed along the partition wall 18 so that the supply air duct 11 and the exhaust air duct 12 as in the first embodiment are formed. The opening and closing of the air duct switching damper 20 is controlled by the ventilation operation control unit 314. That is, the ventilator 300 has a function of allowing the outdoor air to flow into the post-heat exchange outdoor air duct 11b via the post-heat exchange indoor air duct 12b, the heat exchange element 6, and the pre-heat exchange indoor air duct 12a.

When executing the sensing operation for detecting the $CO_2$ concentration in the outdoor air, the ventilator 300 opens the air duct switching damper 20 to block the flow of the return air RA, which is the flow of the indoor air from the room 27, whereby the indoor air does not flow downstream of the air duct switching damper 20 in the pre-heat exchange indoor air duct 12a. At this time, the exhaust blower 5 is stopped, and only the supply blower 3 is operated.

As a result, unlike a normal state in which the exhaust blower 5 is in operation, the outdoor air enters and flows into the exhaust air duct 12 due to the operation of the supply blower 3. That is, as indicated by broken arrows in FIG. 13, the outdoor air is sucked into the post-heat exchange indoor air duct 12b from the exhaust air outlet 10 and is supplied into the room 27 via the intra-element exhaust air duct 12c, the pre-heat exchange indoor air duct 12a, the opening 18a, the post-heat exchange outdoor air duct 11b, the supply blower 3, and the supply air outlet 8. Also, the outdoor air flows through the supply air duct 11 as in the case of the ventilator 100. Therefore, although the exhaust blower 5 is stopped, the operation of the supply blower 3 allows fresh air to be introduced into the room 27 in the building.

When the sensing operation for detecting the $CO_2$ concentration in the outdoor air is executed, the outdoor air flows to the region downstream of the air duct switching damper 20 in the pre-heat exchange indoor air duct 12a as described above. As a result, the outdoor air is supplied to the indoor $CO_2$ sensor 14a arranged in the region downstream of the air duct switching damper 20 in the pre-heat exchange indoor air duct 12a, whereby the indoor $CO_2$ sensor 14a can detect the $CO_2$ concentration in the outdoor air.

On the other hand, when executing the sensing operation for detecting the $CO_2$ concentration in the indoor air, the ventilator 300 moves the air duct switching damper 20 to the closed position. As a result, the outdoor air flows through the supply air duct 11, and the indoor air flows through the exhaust air duct 12 as in the ventilator 100. That is, the indoor air is supplied to the indoor $CO_2$ sensor 14a installed in the exhaust air duct 12, whereby the indoor $CO_2$ sensor 14a can detect the $CO_2$ concentration in the indoor air.

The ventilator 300 switches operation between the sensing operation for detecting the $CO_2$ concentration in the outdoor air and the sensing operation for detecting the $CO_2$ concentration in the indoor air as described above, thereby being able to acquire the detected outdoor air $CO_2$ concentration value and the $CO_2$ concentration in the indoor air. As a result, the ventilator 300 can calculate the corrected first switching threshold and the corrected second switching threshold, which are the corrected thresholds, as in the case of the ventilator 100. The other configurations and functions of the ventilator 300 are similar to those of the ventilator 100.

As described above, the ventilator 300 according to the third embodiment has the effect similar to that of the ventilator 100 according to the first embodiment.

Moreover, the ventilator 300 opens and closes the air duct switching damper 20 to switch operation between the sensing operation for detecting the $CO_2$ concentration in the outdoor air and the sensing operation for detecting the $CO_2$ concentration in the indoor air, thereby being able to detect the detected outdoor air $CO_2$ concentration value and the $CO_2$ concentration in the indoor air using one $CO_2$ sensor, or the indoor $CO_2$ sensor 14a installed in the pre-heat exchange indoor air duct 12a. As a result, the ventilator 300 can eliminate the outdoor $CO_2$ sensor for detecting the $CO_2$ concentration in the outdoor air and reduce the cost.

Note that the indoor $CO_2$ sensor 14a can adopt a simple calibration method by assuming that the $CO_2$ concentration in the outdoor air is 400 ppm, for example, and the minimum $CO_2$ concentration in the indoor air is 400 ppm, but according to the third embodiment, the $CO_2$ concentration in the outdoor air can be reliably detected, so that the accuracy of simple calibration of the indoor $CO_2$ sensor 14a can be improved. Similarly, the first and second embodiments use the outdoor $CO_2$ sensor 14b to directly detect the $CO_2$ concentration in the outdoor air and can thus improve the accuracy of simple calibration as in the third embodiment, but the third embodiment uses one sensor that is the indoor $CO_2$ sensor 14a, and thus has an advantage in terms of cost.

Note that another control method in the case of using one $CO_2$ sensor, that is, the indoor $CO_2$ sensor 14a installed in the pre-heat exchange indoor air duct 12a, as in the third embodiment includes a method in which the $CO_2$ concentration in the indoor air is detected using the indoor $CO_2$ sensor 14a, and the detected outdoor air $CO_2$ concentration value is measured by a human using a $CO_2$ sensor on a regular basis and directly input to the control device 13 through the remote control 17 of the ventilator 300. As a result, as in the third embodiment, the ventilator 300 can eliminate the outdoor $CO_2$ sensor for detecting the $CO_2$ concentration in the outdoor air and reduce the cost. Moreover, unlike the third embodiment, the air duct switching damper 20 need not be provided for the indoor $CO_2$ sensor 14a installed in the pre-heat exchange indoor air duct 12a to perform the sensing operation for detecting the $CO_2$ concentration in the outdoor air, so that there is an advantage of being able to further simplify the structure of the apparatus.

Note that although the above embodiment has described the case where the ventilator 100 is the heat exchange ventilator, the ventilator 100 may be a ventilator not including the heat exchange element 6. That is, the ventilator 100 is not limited to the heat exchange ventilator as long as it has the ventilation function.

Moreover, in the above embodiment, the blower unit 23 of the ventilator 100 includes the supply blower 3 and the exhaust blower 5, but the configuration of the blower unit 23 is not limited to such an example. For example, the blower unit 23 may include only the supply blower 3 or only the exhaust blower 5. That is, the ventilator 100 may include the supply blower 3 and the supply air duct 11 as well as the exhaust blower 5 and the exhaust air duct 12 to supply and exhaust air, may include only the supply blower 3 and the supply air duct 11 to only supply air, or may include only the exhaust blower 5 and the exhaust air duct 12 to only exhaust air.

The configurations illustrated in the above embodiments merely illustrate an example of the content of the present invention, and thus the techniques of the embodiments can be combined together or combined with another known technique, or the configurations can be partially omitted and/or modified without departing from the scope of the present invention.

REFERENCE SIGNS LIST

1 main body; 1a housing; 2 supply motor; 3 supply blower; 4 exhaust motor; 5 exhaust blower; 6 heat exchange element; 7 outdoor air inlet; 8 supply air outlet; 9 indoor air inlet; 10 exhaust air outlet; 11 supply air duct; 11a pre-heat exchange outdoor air duct; 11b post-heat exchange outdoor air duct; 11c intra-element supply air duct; 12 exhaust air duct; 12a pre-heat exchange indoor air duct; 12b post-heat exchange indoor air duct; 12c intra-element exhaust air duct; 13 control device; 14 $CO_2$ detection unit; 14a indoor $CO_2$ sensor; 14b outdoor $CO_2$ sensor; 15 supply air filter; 16 exhaust air filter; 17 remote control; 18, 19, 21, 22 partition wall; 18a opening; 20 air duct switching damper; 23 blower unit; 25 ceiling; 26 ceiling space; 27 room; 28 outer wall; 31 first control unit; 32 first storage unit; 33 first communication unit; 41 second communication unit; 42 operation unit; 43 display unit; 44 second storage unit; 45 second control unit; 51 communication line; 100, 200, 300 ventilator; 101 processor; 102 memory; 311 $CO_2$ concentration acquisition unit; 312 corrected threshold calculation unit; 313 ventilation air volume control unit; 314 ventilation operation control unit; a difference; β, β1, β2 coefficient.

The invention claimed is:

1. A ventilator comprising:
    a blower to exchange indoor air;
    a corrected threshold calculator to calculate a corrected threshold by correcting an initial predetermined threshold of $CO_2$ concentration in the indoor air set in advance, for changing a ventilation air volume on a basis of a detected outdoor air $CO_2$ concentration value that is $CO_2$ concentration in outdoor air detected; and
    a ventilation air volume controller to change the ventilation air volume by controlling an air volume of the blower unit on a basis of the $CO_2$ concentration in the indoor air and the corrected threshold.

2. The ventilator according to claim 1, further comprising a main body in which a supply air duct and an exhaust air duct are formed, the supply air duct allowing the outdoor air to be supplied into a room, and the exhaust air duct allowing the indoor air to be exhausted to outside, wherein
    the blower includes a supply blower that is installed in the supply air duct and an exhaust blower that is installed in the exhaust air duct.

3. The ventilator according to claim 1, further comprising a $CO_2$ detector to detect the $CO_2$ concentration in the indoor air and the $CO_2$ concentration in the outdoor air.

4. The ventilator according to claim 3, wherein
    the $CO_2$ detector includes a first $CO_2$ sensor to detect the $CO_2$ concentration in the indoor air and a second $CO_2$ sensor to detect the $CO_2$ concentration in the outdoor air.

5. The ventilator according to claim 3, wherein
    the $CO_2$ detector detects the $CO_2$ concentration in the indoor air and the $CO_2$ concentration in the outdoor air by one $CO_2$ sensor.

6. The ventilator according to claim 1, wherein
    the corrected threshold calculator calculates the corrected threshold on a basis of a result of comparing a reference outdoor air $CO_2$ concentration value with the detected outdoor air $CO_2$ concentration value, the reference outdoor air $CO_2$ concentration value being a predetermined reference value of the $CO_2$ concentration in the outdoor air.

7. The ventilator according to claim 6, wherein
    the corrected threshold calculator calculates the corrected threshold by calculating a difference between the reference outdoor air $CO_2$ concentration value and the detected outdoor air $CO_2$ concentration value, and adding the difference to the predetermined threshold, or
    the corrected threshold calculator calculates the corrected threshold by adding, to the predetermined threshold, a product of the difference and a coefficient that adjusts a degree of correction of the predetermined threshold by the difference.

8. The ventilator according to claim 7, wherein
    the ventilation air volume is configured to be changed in stages to at least three levels using a plurality of the predetermined thresholds being different, and
    the corrected threshold calculator calculates the corrected threshold by adding the difference to the predetermined threshold for a part of the plurality of the predetermined thresholds being different, and calculates the corrected threshold by adding the product of the coefficient and the difference to the predetermined threshold for another part of the plurality of the predetermined thresholds being different.

9. The ventilator according to claim 7, wherein
    the coefficient is capable of being changed.

10. The ventilator according to claim 7, wherein
    the ventilation air volume is configured to be switched in stages to at least three levels using a plurality of the predetermined thresholds being different, and
    the corrected threshold calculator calculates the corrected threshold by adding the difference to the predetermined threshold for a part of the plurality of the predetermined thresholds being different, and does not correct another part of the plurality of the predetermined thresholds being different.

11. The ventilator according to claim 6, wherein
    the reference outdoor air $CO_2$ concentration value is capable of being changed.

12. The ventilator according to claim 1, wherein
    the predetermined threshold is capable of being changed.

13. The ventilator according to claim 12, wherein
    the ventilation air volume is configured to be switched in stages to at least three levels using a plurality of the predetermined thresholds being different, and
    at least a part of the plurality of the predetermined thresholds being different is capable of being changed.

14. The ventilator according to claim 1, wherein
    the corrected threshold calculator calculates the corrected threshold when the detected outdoor air $CO_2$ concentration value is 3500 ppm or lower.

15. A ventilation control method comprising:
    acquiring information on $CO_2$ concentration in indoor air detected;
    acquiring information on $CO_2$ concentration in outdoor air detected;
    calculating a corrected threshold by correcting an initial predetermined threshold of the $CO_2$ concentration in the indoor air set in advance, for changing a ventilation air volume on a basis of the information on the $CO_2$ concentration in the outdoor air acquired; and controlling the ventilation air volume on a basis of the $CO_2$ concentration in the indoor air and the corrected threshold.

16. The ventilator according to claim 1, wherein
the corrected threshold calculator calculates a second corrected threshold by correcting an initial predetermined second threshold of $CO_2$ concentration in the indoor air set in advance, for changing the ventilation air volume on the basis of the detected outdoor air $CO_2$ concentration value, the ventilation air volume controller changing the ventilation air volume by controlling the air volume of the blower unit on the basis of the $CO_2$ concentration in the indoor air and the second corrected threshold.

17. The ventilation control method according to claim 15, comprising:
calculating a second corrected threshold by correcting an initial predetermined threshold of the $CO_2$ concentration in the indoor air set in advance, for changing a ventilation air volume on a basis of the information on the $CO_2$ concentration in the outdoor air acquired; and
controlling the ventilation air volume on a basis of the $CO_2$ concentration in the indoor air and the second corrected threshold.

* * * * *